(12) United States Patent
Hank

(10) Patent No.: US 8,354,029 B2
(45) Date of Patent: Jan. 15, 2013

(54) CONTROLS OF A FILTRATION SYSTEM

(75) Inventor: Michael Hank, Kinsau (DE)

(73) Assignee: Seccua GmbH, Steingaden (DE)

( * ) Notice: Subject to any disclaimer, the term of this patent is extended or adjusted under 35 U.S.C. 154(b) by 852 days.

(21) Appl. No.: 12/293,071

(22) PCT Filed: Mar. 15, 2007

(86) PCT No.: PCT/EP2007/052477
§ 371 (c)(1),
(2), (4) Date: Feb. 12, 2009

(87) PCT Pub. No.: WO2007/104797
PCT Pub. Date: Sep. 20, 2007

(65) Prior Publication Data
US 2009/0218285 A1    Sep. 3, 2009

(30) Foreign Application Priority Data

Mar. 16, 2006 (DE) .......................... 10 2006 012 198

(51) Int. Cl.
*B01D 37/00* (2006.01)
(52) U.S. Cl. .......... 210/739; 210/90; 210/100; 210/110; 210/134; 210/321.6; 210/650; 210/741; 210/767; 73/38; 73/40; 96/417; 96/421; 702/113; 702/114; 455/414.1; 455/466
(58) Field of Classification Search ............... 210/90, 210/96.1, 96.2, 97, 100, 109, 110, 134, 137, 210/321.6, 637, 650, 739, 741, 767; 73/38, 73/40, 61.63, 64.55, 587; 96/417, 421; 700/266, 700/273; 702/113, 114; 455/414.1, 466
See application file for complete search history.

(56) References Cited

U.S. PATENT DOCUMENTS

| 4,701,861 | A  |   | 10/1987 | Kauke |
| 4,909,937 | A  | * | 3/1990  | Hoffmann et al. ............ 210/315 |
| 5,064,529 | A  | * | 11/1991 | Hirayama et al. ............. 210/90 |
| 5,457,986 | A  | * | 10/1995 | DiLeo et al. ...................... 73/38 |
| 5,476,592 | A  |   | 12/1995 | Simard |
| 5,594,161 | A  | * | 1/1997  | Randhahn et al. ................ 73/38 |
| 6,324,898 | B1 | * | 12/2001 | Cote et al. ......................... 73/38 |
| 6,568,282 | B1 | * | 5/2003  | Ganzi ......................... 73/861.42 |
| 6,649,063 | B2 |   | 11/2003 | Brugger et al. |
| 6,829,551 | B2 | * | 12/2004 | Von Der Hardt et al. ..... 702/114 |

(Continued)

FOREIGN PATENT DOCUMENTS

DE          69030992 T2    5/1990

(Continued)

OTHER PUBLICATIONS

Derwent translation for Foreign Patent FR 2,845,846, published Apr. 16, 2004.*

(Continued)

*Primary Examiner* — Joseph Drodge
(74) *Attorney, Agent, or Firm* — Knobbe Martens Olson & Bear LLP

(57) ABSTRACT

A control device for a filtration unit for filtering a fluid, the control device comprising an integrity test unit for performing an integrity test for checking the functional integrity of the filtration unit, and a reaction unit for determining a reaction based on a result of the integrity test.

22 Claims, 14 Drawing Sheets

U.S. PATENT DOCUMENTS

| | | | |
|---|---|---|---|
| 7,225,037 B2 * | 5/2007 | Shani | 700/18 |
| 2004/0007527 A1 | 1/2004 | Kristian et al. | |
| 2004/0079700 A1 | 4/2004 | Wood et al. | |
| 2007/0163965 A1 * | 7/2007 | Wolfe | 210/739 |

FOREIGN PATENT DOCUMENTS

| | | | |
|---|---|---|---|
| DE | 42 39 937 | | 6/1994 |
| DE | 101 35 295 | | 2/2003 |
| EP | 0 139 202 | | 5/1985 |
| FR | 2845846 | * | 4/2004 |
| WO | WO 94/11721 | | 5/1994 |
| WO | WO 96/28236 | | 9/1996 |
| WO | WO 01/16030 | | 3/2001 |
| WO | WO 01/39870 | | 6/2001 |
| WO | WO 03/106003 A1 | | 12/2003 |
| WO | WO 2004/092079 A1 | | 10/2004 |

OTHER PUBLICATIONS

Communication from the German Patent and Trademark Office related to corresponding German patent application No. 10 2006 012 198.8-41, mailed Apr. 29, 2010, anonymous.

International Preliminary Report on Patentability issued in connection with corresponding PCT application No. PCT/EP2007/052477, dated Nov. 4, 2008, anonymous.

International Search Report in connection with corresponding PCT application No. PCT/EP2007/052477, Jun. 21, 2007, anonymous.

* cited by examiner

| Valve | Position | Current |
|---|---|---|
| V1 | opened | 0 |
| V2 | closed | 0 |
| V3 | opened | 0 |
| V4 | closed | 0 |
| V5 | opened | 0 |
| V6 | closed | 0 |

| Valve | Position | Current |
|-------|----------|---------|
| V1 | closed | 1 |
| V2 | opened | 1 |
| V3 | closed | 1 |
| V4 | opened | 1 |
| V5 | opened | 1 |
| V6 | closed | 0 |
Fig. 10
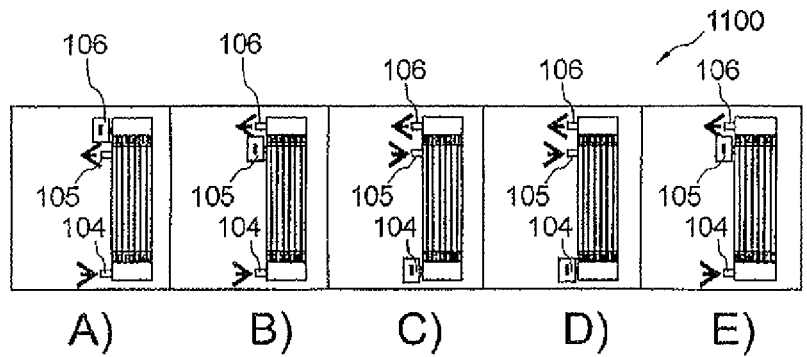
Fig. 11
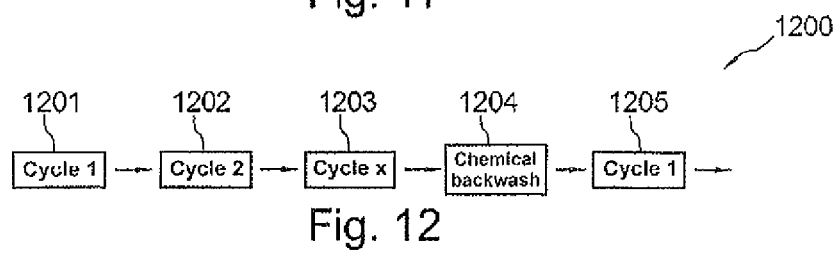
Fig. 12
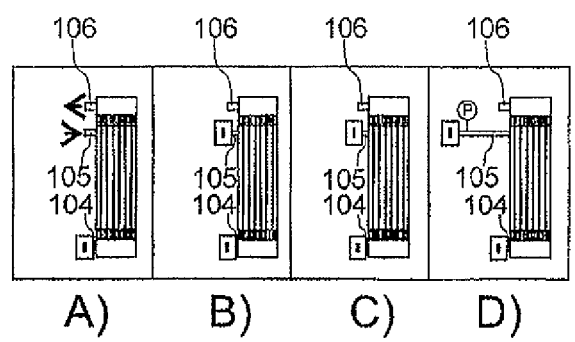
Fig. 13

| | Filtration | Cleaning | | | | Integrity Test | |
|---|---|---|---|---|---|---|---|
| | Dead-End | Forward Flush | Backwash F1 | Backwash F2 | alternative: F1 and F2 | Forward Flush | Dewatering | Idle State | Measuring |
| Valves | | | | | | | | | |
| Inlet F1 (V1) | opened (0) | opened (0) | closed (1) | opened (0) | closed (1) | opened (0) | closed (1) | closed (1) | closed (1) |
| Outlet F1 (V2) | closed (0) | opened (1) | opened (1) | closed (1) | opened (1) | opened (1) | opened (1) | opened (1) | opened (1) |
| Inlet F2 (V3) | opened (0) | opened (0) | opened (0) | opened (1) | closed (1) | opened (0) | closed (1) | closed (1) | closed (1) |
| Outlet F2 (V4) | closed (0) | opened (1) | closed (0) | opened (1) | opened (1) | closed (1) | opened (1) | opened (1) | opened (1) |
| Filtrate Valve (V5) | opened (0) | closed (1) | closed (1) | closed (1) | closed (0) | closed (0) | closed (1) | closed (1) | closed (1) |
| Compressed Air Valve (V6) | closed (0) | closed (0) | closed (0) | closed (0) | closed (0) | closed (0) | opened (1) | closed (0) | closed (0) |
| Pumps | | | | | | | | | |
| Inlet* | on (1)* | on (1)* | on (1)* | on (1)* | off (0) | on (1)* | off (0) | off (0) | off (0) |
| Dosing Pump Feed* | on (1)* | on (1)* | on (1)* | on (1)* | on (1)* | on (1)* | off (0) | off (0) | off (0) |
| Backwash Pump* | off (0) | off (0) | off (0) | off (0) | on (1)* | off (0) | off (0) | off (0) | off (0) |
| Dosage Backwash* | off (0) | off (0) | on (1)* | on (1)* | on (1)* | off (0) | off (0) | off (0) | off (0) |
| Air Compressor | off (0) | off (0) | off (0) | off (0) | off (0) | off (0) | opened (1) | off (0) | off (0) |

CONTROLS OF A FILTRATION SYSTEM

RELATED APPLICATIONS

This application is the U.S. National Phase filing under 35 U.S.C. §371 of PCT/EP2007/052477, filed Mar. 15, 2007, which designated the United States and was published in a language other than English, which claims priority under 35 U.S.C.§119(a)-(d) to German Patent Application No. DE 10 2006 012 198.8, filed Mar. 16, 2006. The contents of these applications are incorporated herein by reference in their entireties.

This patent application claims the benefit of the German patent Application DE 10 2006 012 198.8, filed on Mar. 16, 2006.

TECHNICAL FIELD

The invention relates to a control device for a filtration unit, a filtration unit for filtering a fluid, a method of controlling a filtration unit for filtering a fluid, a computer-readable data carrier and a program element.

BACKGROUND

Ultrafiltration refers to a technique for separating (macromolecular) substances or for reconcentrating the same. Ultrafiltration techniques are also used for treating drinking water, for example for removing bacteria and viruses prior to providing drinking water to an end consumer.

Microfiltration and ultrafiltration are distinguished by the degree of separation. If particles are separated having a size of 0.5 µm to 0.1 µm, this is called microfiltration, if the size of the particles is 0.1 µm to 0.01 µm, this is referred to as ultrafiltration.

Known ultrafiltration systems for treating drinking water suffer from a reliability that is partially in need of improvement, in particular when damage of the membrane is involved or when the quality of the water to be filtered varies, e.g. due to weather influences.

The document U.S. Pat. No. 5,476,592 discloses a blood filtration installation. An injection device of the blood filtration installation contains means for checking the integrity of a main filter during blood filtration. These checking means contain a second filter for bacteria retention. Two pressure sensors are connected to the secondary filter. The pressure sensor signals are supplied to a control unit which calculates a differential pressure and compares the same with a threshold value. If a membrane of the main filter is damaged, bacteria might be introduced into the second filter. A resulting clogging leads to an increase of the pressure difference between both sides of the secondary filter. When this differential pressure reaches a threshold value, then the control unit triggers alarm means and causes a stop of the pump.

The document U.S. Pat. No. 6,649,063 B2 discloses a medical therapy system for producing a sterile replacement fluid. A corresponding filter may be tested by means of an integrity test so as to secure that the replacement fluid has been correctly filtered during sterilization.

The document US 2004/0079700 A1 discloses a method of testing the integrity of a membrane. For this purpose, the membrane is supplied with a supply flow of a solution having a known concentration. The downstream (or permeate-sided) concentration of this solution may be detected for determining if there is a defect in the membrane.

The document DE 690 30 992 T2 discloses to make use of a receiving device in dialysis treatments carried out at home, where the uninterrupted presence of a specialist (physician or nurse) for monitoring the sequence of treatment is not intended, which receiving device being connected with a dialysis device, for example, through a telephone line, for performing a monitoring of the dialysis device from a distance and without interruption.

SUMMARY

It is an object of the present invention to provide a reliable filter system.

This object is achieved by a control device for a filtration unit for filtering a fluid, by a filtration unit for filtering a fluid, by a method of controlling a filtration unit for filtering a fluid, by a computer-readable data carrier, and by a program element having the features according to the independent claim.

According to an exemplary embodiment of the present invention, a control device for a filtration unit for filtering a fluid is provided, wherein the control device comprises an integrity test unit for performing an integrity test for checking the functional integrity of the filtration unit, and a reaction unit for determining (and, if necessary, initiating and/or executing) a reaction based on a result of the integrity test.

According to another exemplary embodiment of the present invention, a filtration unit for filtering a fluid is provided, comprising a control device having the features described above.

According to a further exemplary embodiment of the present invention, a method of controlling a filtration unit for filtering a fluid is provided, wherein the method comprises performing an integrity test for checking the functional integrity of the filtration unit and determining a reaction based on a result of the integrity test.

According to still another exemplary embodiment of the present invention, a computer-readable data carrier (e.g. an integrated memory, a CD, a floppy disk, a hard disk, a USB stick, a memory card) is provided, on which a program for controlling a filtration unit for filtering a fluid is stored, which, when executed by a processor, controls or performs the method described above.

According to still another exemplary embodiment of the present invention, a program element for controlling a filtration unit for filtering a fluid is provided, which, when executed by a processor, controls or performs the method described above.

Exemplary embodiments of the invention may be realized by means of a computer program, i.e. a software, as well as by means of one or more specific electric circuits, i.e. in hardware, or in any hybrid form, i.e. by means of software components and hardware components.

According to an exemplary embodiment of the invention, a control or regulating device for a filtration unit, e.g. for an ultrafiltration unit for treating drinking water is provided, which carries out (for example in predetermined time intervals) an integrity test in an automated manner, in which it is intended to check whether the filtration unit or determined components thereof is/are functional or not. In dependence on the result of such an automated integrity test, a reaction unit may correspondingly control the entire system, for example switch off the treatment of drinking water upon determination of a problem and/or inform a user, for example through a mobile telephone connection, of the deficient functional integrity or an imminent inoperability or malfunction of the filtration unit. Thereby, the operational safety of the system may be considerably improved, and even in the absence of a human user it may be secured that a water treatment system operates in a fault-free manner.

Exemplary embodiments of the invention may be used in particular advantageously within the scope of a small-scale system for the treatment of drinking water. The term "small-scale system" means in particular systems having a dimensional water treatment configuration for the requirement of an economic unit, a public facility, a household, a housing area, one or more (possibly secluded) farms, a water supply of a part of a town/village, a water treatment of a swimming pool or also a water treatment on the site of use, e.g. in public showers and baths, but also in hospitals or in a self-contained factory. It is true that exemplary embodiments of the invention may also be used in large-scale systems such as a water work, but the automated check of the functional integrity of the entire system may be used particularly advantageously in small-scale systems. Such a small-scale system, for example, may provide a water amount of up to 30 m$^3$/h (for example for supplying a hospital) or even of only 60 l/h (for example for supplying a holiday home only used temporarily).

The filtration unit, for example, may be employed using so-called ultrafiltration membranes, in particular membranes exhibiting a pore size in the range of about 10 to about 20 nm, for example 15 nm. Such a mesh width may ensure that bacteria and viruses are captured by such a filter, and hence a high drinking water quality may be achieved.

Such ultrafiltration units may replace or complement classical chlorine systems or UV-systems. Thus, even in the case of chlorine-resistant germs or micro-organisms which are not destroyed in a sufficiently certain manner by UV radiation, an impeccable drinkable quality may be ensured.

Exemplary embodiments of the invention may be used in a particular advantageous manner in small-scale systems such as, for example, in farms, guest houses in the mountains, parts of towns/villages, hotels, hospitals, etc., especially in all places, where a decentralized water supply is intended to be implemented.

The actual filter characteristics of the filtration unit may be realized using one membrane filter or a plurality of membrane filters. For example, a plurality (e.g. seven) of such membrane filters may be combined into a common membrane device, this increasing the impact resistance and robustness to destruction. The diameter of a single membrane, for example, may be 0.85 mm, but may actually vary. The membranes may be provided in the form of a capillary or a flat membrane, i.e. as hollow-cylindrically shaped structures or wrought in pockets or welded or pasted on carriers, wherein the water to be cleaned flows through the membranes, and microbes or turbidity causing elements are removed from the water while flowing through the membrane.

In an alternative operating mode of such a membrane the flow direction may be reversed for rinsing microbes or turbidity causing elements out from the membrane that had been filtered by the membrane, in order to prevent clogging of the membrane or to clean a membrane, respectively. Furthermore, a flushing may be performed along the membrane, i.e. a conveyance of fluid along the membrane surface so that the microbes or turbidity causing elements previously filtered by the membrane are clearly swept away from the membrane and thus a regeneration of the membrane may be achieved.

According to exemplary embodiments of the invention an integrity test may be performed. The term "integrity test" may in particular be understood as a function test of the membrane that may be used in such a filtration unit. The integrity test may have the task to determine if the membrane functions in a faultless manner or if the membrane, for example, is damaged by clogging or hole formation or is restricted in its performance.

For detecting such a hole in a membrane, which then undesirably serves as a flow channel for turbidity causing elements or microbes actually to be filtered off, a test substance such as activated charcoal may be pumped along or through the membrane, and it may be checked whether this activated charcoal passes the membrane and may hence be detected behind the membrane. If this is the case, i.e. activated charcoal particles having a size larger than the pore width of the membrane (e.g. 15 nm) can get through the membrane, the result of the integrity test will be that the membrane exhibits holes and hence is defective.

Alternatively or additionally, an overpressure or underpressure may be applied to the membrane, for example 1 bar, with a medium intended to displace the water from the membrane, e.g. air or another gas (by way of example carbon dioxide, for instance in the form of a cartridge). Due to prevailing binding forces, water present within the membrane does not exit the membrane at such a pressure. Hence, the air or the gas applied with overpressure or underpressure can only get through the membrane through holes or other defective points. The pressure drop may be measured over time, and when it exceeds a predefinable threshold value per time interval, the membrane can be classified as being defective, and a stop of the filtration unit and/or the output of an alarm may be initiated by means of the reaction unit.

Another exemplary embodiment of such an integrity test is the measurement of a pressure difference across the membrane during the filtration operation. In this kind of integrity test it is monitored whether a discontinuous change of the overpressure or underpressure arises during a membrane filtration or cleaning process, in which the differential pressures across the membrane otherwise change only continuously or remain constant. Damage to the membrane results in a hole in the membrane that is considerably larger than the pore size (e.g. 15 nm), and consequently the differential pressure across the membrane changes abruptly. It can be determined whether a corresponding pressure compensation takes place due to a membrane damage.

In a filtration unit, particularly an ultrafiltration unit, such an integrity test is particularly important, since the insertion of membranes in fact offers significant advantages such as a good functionality with respect to filtering microbes, but on the other hand may be susceptible to a tearing of the membrane, whereby the filter quality and as a result the water quality may be deteriorated unnoticed. Thus, in a water treatment system configured as a filtration unit, the regular performance of integrity tests is a prerequisite for a high reliability and a constantly high water quality.

If it is ascertained in an integrity test that the functional integrity of the filtration unit, in particular of the filtration membrane, is not sufficient, a reaction unit may adjust the operational state of the filtration unit correspondingly in response to such an event. For example, the water throughput may be locked automatically in that an inflow is interrupted (for example, valves are closed or pumps switched off), an outflow is interrupted (for example, valves are closed or pumps switched off), or other modifications are carried out on the filtration unit or by the filtration unit at the immediate periphery (e.g. by means of pumps or valves connected upstream or downstream but which are not integrated into the system).

Alternatively or additionally, a user may be informed by means of a telenotification that the filtration unit possibly does not function faultlessly. This may be done, for example, through an SMS or an MMS, an Internet connection, a Bluetooth connection or a Wireless LAN connection.

Only when the integrity test is conducted free of faults, the system may remain in operation. After switching off a system, a special integrity test may be performed, wherein the system may only be put into operation again, when this special integrity test has been passed successfully.

Advantageously, the control device according to the invention may be retrofit into an already existing system, i.e. into an existing filtration system. The control device may in this respect be delivered as a retrofit set or kit for later installation or may be used as such. According to the invention, it may be sufficient to merely modify the drive of the components of the filtration system so that the part related to fluidics (pumps, valves, membrane, etc.) can remain unchanged. Alternatively, these components may also be adapted according to the invention.

In particular with an ultrafiltration membrane pore size smaller than about 20 nm it is possible to remove viruses from the water to be treated. Bacteria, as well, such as, for example, *E. coli* or even parasites such as, for example, Legionellae may be removed reliably from the drinking water to be treated with such a pore size.

The term "fluid" will be understood within the scope of this application in particular as any liquid or gas, or mixtures of such a liquid or such a gas with another liquid, another gas or a solid matter.

According to an exemplary embodiment, alarms may be output per SMS or through Bluetooth so as to inform the user that his/her water treatment does no longer work correctly.

According to an exemplary embodiment, the filtration may be switched off in the case of defective membranes so that water potentially contaminated with microbes cannot reach the water mains. In case that a membrane integrity test conducted automatically by the system or manually (for example, a pressure-maintaining test such as integrated, or differential pressure measurements, or dosage of particles in the inflow and particle counting or turbidity measurements or others) shows that the membrane is defective or does no longer satisfy the required retention performance for particles, bacteria, viruses, parasites or other contaminants, the unit may ensure that water potentially contaminated with microbes cannot reach the drinking or service water network through the defective filters.

Furthermore, the unit may ensure that by switching off or disconnecting the system this circuit cannot be circumvented. The supply may only take place again after a repeated positive integrity test.

It is also possible to use the control system for retrofitting an existing filtration system.

According to the invention, a complex control system may in particular be integrated and down-sized or provided "on-chip" or "on-board", respectively, for example on a CPU including all electronic components such as AD converters, communication devices, user interfaces, etc.

Further exemplary configurations of the invention will be described next.

Exemplary embodiments of the control means will be described first. These embodiments, however, apply as well to the filtration unit for filtering a fluid, to the method of controlling a filtration unit for filtering a fluid, to the computer-readable data carrier and to the program element.

The integrity test unit may be arranged for an automatic or user-defined realization of the integrity test. The integrity test unit may check automatically, for example, the serviceability of the system in regular intervals (e.g. once per hour, once a day, etc.). Alternatively or additionally, the integrity test unit may carry out the integrity test upon a corresponding instruction by a human user.

The integrity test unit may be arranged for realizing the integrity test to check the functional integrity of a filter membrane for filtering the fluid. A filter membrane in a filtration unit rather constitutes a weaker and more fault-susceptible member. When the filter membrane is defective, micro-organisms may get into the drinking water without protection. Hence, checking the filter membrane is particularly important for ensuring a perfect drinking water quality.

The integrity test unit may be arranged for checking the functional integrity of the filter membrane by conveying a test substance which is impermeable to the filter membrane in the functional state of the filter membrane. For example, activated charcoal or another substance having a size impermeable to a filtration membrane free of defects may be passed through the membrane. If this test substance, however, gets through the membrane, which can be detected by means of a corresponding detection unit, a defective filter membrane may be assumed, and the integrity test will be negative.

Alternatively or additionally, the integrity test unit may be arranged for checking the functional integrity of the filter membrane by applying a test pressure to the filter membrane and by measuring the time response of the test pressure at the filter membrane. A test pressure of one bar or several bars my be applied, for example, which in case of a binding of water molecules in the pores of the membrane leads to the fact, that a faultless membrane maintains this pressure over a relatively long time. If, however, the membrane includes a hole, depressurization takes place in a relatively short time so that conclusions may be drawn as to the functional integrity by measuring the time dependence of the variation of pressure. As a decision criterion may be defined that exactly when the pressure drop is faster than a corresponding threshold value the membrane will be classified as being defective.

The reaction unit in response may switch off at least a part of the filtration unit in the case of a lacking functional integrity of the filtration unit identified by the integrity test unit. If the filtration unit comprises several parallel paths, for example several membranes filtering water independently from each other, then only that part of the filtration unit may be switched off in which a defect has been detected. Thus, a preservation of the drinking water supply may be ensured even in a state of fault.

In the case of a lacking functional integrity of the filtration unit identified by the integrity test unit, the reaction unit in response may also generate an alarm message. Such an alarm message may be an optical or acoustical alarm. The alarm message may occur at the filtration unit itself or also alternatively or additionally at a communication unit (e.g. a mobile telephone) situated at a remote place.

The alarm message, for example, may include a telenotification to a user. This telenotification may be wire-bound or wireless. This telenotification may take place by means of a communication path included in a telecommunication network, a mobile telephony network, the Internet, a WLAN, an Intranet, a Bluetooth network, an infrared network, an electric power network or another communication path. For example, an e-mail or an SMS may be transmitted to a user having the content that the user's filtration unit possibly is defective.

The control device may further comprise a restart unit which can be arranged for identifying a restored functional integrity of the filtration unit after a malfunction and for restarting the filtration unit. If a defect has been ascertained and removed, one or more integrity tests may be conducted so as to ensure that the repaired unit is functional again. The unit may be put back into operation only when this test or these tests is or are successful.

Furthermore, the unit may include a function permitting the user to continue filtration for a defined and limited maximum period, e.g. 2 days, upon an identified defective membrane and after notification by the control device, so as to ensure the supply of drinking water until the filter units can be renewed or repaired.

The control device may be enabled to be arranged so as to be communicative bi-directionally with a user situated in a remote place. If the user, for example, has been informed about a possible defect of the filtration unit via a telecommunication link, the user may supply the instruction to the control device via this telecommunication link that the filtration unit shall remain in use regardless of the possible defect. Another instruction is the switch-off of the filtration unit or the directive to carry out an extra function test.

Via a communication link between the control device and the user it is also possible to transmit other operational data of the filtration unit (e.g. the current output rate).

The filtered water amount may also be taken as a basis for calculating a fee for the use of the filtration system, and the calculated rental fee, for example, may be transmitted to the user per SMS so that an automated accounting system may be implemented.

The control device may be arranged in form of a monolithic integrated circuit. For example, all or a part of the components of the control device may be provided within an integrated circuit, for example, within an integrated circuit produced by means of silicon technology. Instead of silicon technology, another group IV semiconductor, e.g. germanium, may also be considered as a substrate. Group III-V semiconductor systems, for example, gallium arsenide, may likewise be used. By means of a monolithic integrated circuit the control device may be manufactured in a manner able to be miniaturized and may be accommodated in a place-saving and cost-saving manner.

The control device may be arranged as a retrofit kit for installation into an existing filtration system or may be used as a retrofit kit for installation into an existing filtration system. The control devices consequently may only replace those components in a modular way which according to the invention have to be replaced in comparison to a traditional filtration system. For example, merely a CPU or an integrated circuit may be replaced requiring no special expertise in the exchange of such a system for retrofitting into an existing filtration system.

Embodiments of the filtration unit will be described in the following. However, these embodiments apply as well to the control device, to the method, to the computer-readable data carrier and to the program element.

The filtration unit may comprise at least a filtration membrane in the form of a hollow fiber or a plate membrane or a membrane pocket, etc. for filtering the fluid. A plurality of hollow fibers also may be combined into a unit, for example seven or more hollow fibers in one membrane, wherein any number of such membrane fibers may be provided in a common module. One filter procedure or more parallel paths of filter procedures may be executed so that in the case of one path failing, the remaining paths can be used.

At least one filter membrane may be selected from a group consisting of a fine filter membrane, a microfilter membrane, an ultrafilter membrane and a nanofilter membrane. Depending on the pore size, a fine filter (for example a sand filter), a microfilter (for example up to a pore size of 0.1 μm for removing bacteria), an ultrafilter (for example up to a pore size of 10 nm for removing viruses), a nanofilter (with a pore size of up to 1 nm), and a dynamic filter may be distinguished (the pore size of a dynamic filter, for example, is determined by the substances contained in the water). Exemplary embodiments of the invention may be used advantageously for each of these size categories, but may be used advantageously in particular in ultrafiltration filters with regard to the high harmfulness of viruses in drinking water to be treated.

The filtration unit may comprise an inlet connection for feeding the fluid to be filtered to the filter membrane. The inlet connection, for example, may be connected to the public water network and may provide water from the public water network that has to be filtered subsequently.

The filtration unit may further comprise a filter fluid connection for discharging the fluid filtered by means of the filter membrane. Such a filter fluid connection is separated from the inlet connection by the filter membrane so that only the filtered water is provided via the filter fluid connection for the water supply of the connected entity, e.g. a private household.

The filtration unit may further comprise an outlet connection for discharging fluid that has not flown through the filter membrane. Such an outlet is necessary for discharging contaminated water, for example, upon detection of a malfunction, or for discharging the polluted cleaning water during rinsing operations, for cleaning the membrane, or for recirculating water fed in through the inlet connection continuously into the inflow of the unit (e.g. when the unit is used in a batch process).

Moreover, the filtration unit may comprise at least one valve (for example, a solenoid valve or a valve controllable by means of a fluid flow), preferably a plurality of such valves, the operational states of the inlet connection, filter fluid connection and outlet connection being adjustable by means of the valve/s. Thus, a fluid flow direction may be defined by correspondingly driving the valves by means of the control device.

In a filtration mode, the fluid may reach the filter fluid connection from the inlet connection through the at least one filter membrane so that in this manner drinking water is provided at the filter fluid connection. In a membrane rinsing mode, the fluid may flow from the inlet connection along the at least one filter membrane to the outlet connection so that a membrane surface is rinsed and particles of the membrane clearly filtered off beforehand are swept away from the same so as to clean and regenerate the membrane for a new filter process. In a reflux mode for conveying the fluid from the filter fluid connection through the at least one filter membrane to the outlet connection, the fluid clearly flows in an opposite flow direction as compared to the filtration mode, so that water flows through the membrane in the reverse direction and removes contaminants possibly present at the exit surface of the membrane so as to regenerate the membrane.

The filtration unit may comprise one or more pumps for conveying the fluid through the filtration unit. Such a water pump, for example, may work in a uni-directional or bi-directional manner.

The filtration unit may be arranged as a small-scale system for drinking water treatment. It may in particular be arranged for supplying one, some single or a few private households with drinking water. Such a filtration unit thus is suited for a decentralized water supply, for example in secluded mountain villages, lonely farms, mountain refuges, or for facilities locally requiring a particularly high water quality (for example, a biolaboratory, a chemical laboratory, a factory for producing food or beverages, etc.). But the filtration unit may also be integrated in sanitary equipment (e.g. in showers) and may be used where a disinfection of the water is necessary directly at the tap point so as to avoid a reinfection of the pipeline downstream of the filter unit (e.g. by Legionellae).

BRIEF DESCRIPTION OF THE DRAWINGS

In the following, exemplary embodiments of the present invention will be described in detail with reference to the following Figures.

FIG. 10 shows a table with valve positions in a backwash mode.

FIGS. 11A through 11E show various steps of a filtration cycle.

FIG. 12 shows various cycles of a chemically supported backwash method.

FIGS. 13A through 13D show various operating states within the scope of an integrity test.

FIG. 14 is a table with valve positions and pump status in various operating states.

Figure 1:
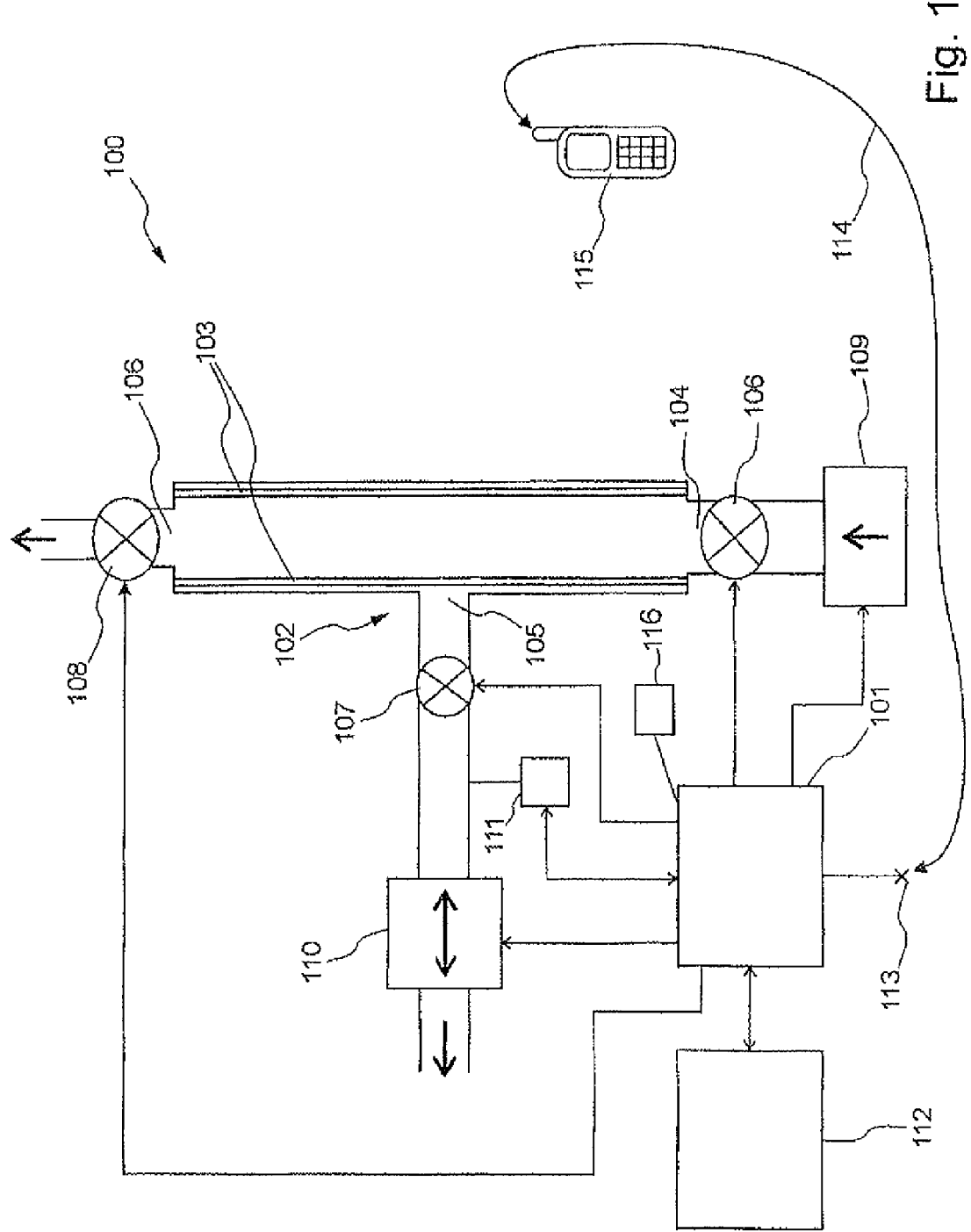
FIG. 1 shows a filtration unit for filtering water according to an exemplary embodiment of the invention.

The representations in the Figure are schematic and not true to scale.

Identical or similar components in different Figures are designated with identical reference numerals.

DETAILED DESCRIPTION OF THE PREFERRED EMBODIMENT

In the following, a filtration unit 100 according to an exemplary embodiment of the invention will be described with reference to FIG. 1.

The filtration unit 100 comprises a control device configured as a microprocessor (CPU, "central processing unit").

The filtration unit 100 includes a filter block 102, the core part of which is an ultrafiltration membrane 103. The ultrafiltration membrane 103 comprises pores in the order of a maximum of 20 nm, so that it is also suited for removing viruses from water to be cleaned.

The filtration unit 100 includes an inlet connection 104 for feeding the drinking water to be filtered to the ultrafiltration membrane 103. The filtration unit 100 further includes a filter fluid connection 105 for discharging the drinking water filtered by means of the ultrafiltration membrane 103. More- over, the filtration unit 100 includes an outlet connection 106 for discharging water that has not flown through the ultrafiltration membrane 103.

Moreover, a first solenoid valve 106, a second solenoid valve 107 and a third solenoid valve 108 are provided in the filtration unit 100. The three solenoid valves 106 through 108 are controlled by the CPU 101, this also enabling the operating state of the filtration unit 100 to be defined.

In a first operating state, that can be designated as a filtration mode, the drinking water to be filtered is conveyed through the ultrafiltration membrane 103 from the inlet connection 104 to the filter fluid connection 105. In this operating state, the first and second solenoid valves 106 and 107 are opened, and the third solenoid valve 108 is closed.

In a membrane rinsing mode, the first and the third solenoid valves 106 and 108 are opened for conveying the drinking water to be filtered from the inlet connection 104 along the ultrafiltration membrane 103 to the outlet connection 106, and the second solenoid valve 107 is closed.

In a reflux mode for conveying the drinking water from the outlet connection 105 through the ultrafiltration membrane 103 to the outlet connection 106, the first solenoid valve 106 is closed, whereas the second and third solenoid valves 107 and 108 are opened.

For conveying the drinking water through the filtration unit 100, a first water pump 109 is provided, and a second water pump 110 is provided. According to the described exemplary embodiment, the first water pump 109 is configured for unidirectionally conveying water (in arrow direction), whereas the second water pump 110 is configured such that the fluid conveying direction is adjustable. The second water pump 110 may be integrated, but may also be replaced by a pressure vessel (either a membrane expansion vessel, or another pressure storing unit, if necessary, integrated in a membrane module).

The filtration unit 100 is provided as a small-scale unit for the drinking water treatment of a household (e.g. for a single family house), and hence may be connected to the public water-supply network such as is usually intended in a household.

The public water-supply network may be coupled with the first water pump 109 which conveys the water in the interior space between the delimiting membrane walls of the ultrafiltration membrane 103 in an open state of the solenoid valve 106, or may be coupled directly with the valve 106 without an additional pressure increase, essentially the same effect being achieved in both states. If the valve 107 is opened and the valve 108 is closed, water will flow through the ultrafiltration membrane 103, at the same time will be freed by means of filtration from viruses, bacteria and other contaminants having dimensions smaller than the pore size of the ultrafiltration membrane 103, and may be provided to a household as service water, if necessary, by a further pressure increase (here water pump 110).

However, if the second solenoid valve 107 is closed and the third solenoid valve 108 opened, the rinsing water may be supplied to an outlet (not shown) through the outlet connection 106. As can be seen from FIG. 1, the CPU 101 does not only control the solenoid valves 106 through 108 but also the pumps 109, 110, and is coupled with a manometer 111 measuring the pressure at the corresponding point.

Moreover, the CPU 101 is coupled with a user interface 112, through which a user may provide the CPU 101 with control information or may be provided with information from the CPU 101. The user interface 112 may be a graphical user interface (GUI) comprising a display unit such as, for example, an LCD display or a plasma display panel. Furthermore, input elements may be provided in the user interface 112 such as a keyboard, a joystick, a mouse, a touch screen or a microphone of a voice recognition system, or a possible terminal for controlling the system by a PC to be connected (e.g. over a serial or parallel, hardwired or wireless connection).

The control device 101 is configured such as to carry out an integrity test for checking the functional integrity of the filtration unit 100, in particular the ultrafiltration membrane 103, each in a freely selectable interval (e.g. one hour). A reaction unit is further provided in the CPU 101 determining based on a result of such an integrity test how the system 100 is to react to the same, and taking the corresponding measures to implement this reaction.

If the integrity test shows that the membrane 103 is possibly damaged, the unit 100 may be switched off, for instance. Within the integrity test, an air or gas pressure of 1 bar, for example, may be applied to the adjacent surface of the ultrafiltration membrane 103 by means of the pump. Due to water bound in the ultrafiltration membrane 103, a rapid pressure decrease of this applied overpressure is avoided between the two membrane sides. Only when the pressure drop occurs in an excessively rapid manner, for example, because the membrane 103 is damaged by cracks or holes, the functional integrity of the ultrafiltration membrane 103 will be judged to be deficient and the filtration unit 100 will be turned off. The pressure drop may be measured by the manometer 110. If the pressure drop per time unit exceeds a certain threshold value, the ultrafiltration membrane 103 is assumed to be non-operational.

In such a case the CPU 101 does not only switch off the filtration unit 100 but also transmits a corresponding alarm via a transmitting interface 113 being in communication connection with a user's mobile telephone receiver 115 over a telecommunications network 114. Using the user interface 112, the user may input a communication link, to which an alarm message is to be transmitted in the case of a failed integrity test. In other words, an SMS will be sent to the user via the communication path 114 from which the user can see that the ultrafiltration unit does no longer work properly. Moreover, an optical or acoustical alarm may be generated through an optical or acoustical output unit 116, so as to display the lacking functional integrity at the filtration unit 100 locally as well. The user also has the possibility to send defined commands per SMS to the interface 113 so as to initiate immediate measures from the distance, e.g. a new integrity test may be initiated in this manner or a switch-off of the unit may be delayed until either the filter modules have been repaired or replaced or a maximum tolerable period of time has been exceeded.

When the (defective) ultrafiltration membrane 103 has been replaced by the user or by maintenance personnel, the CPU 101 will execute an automatically or manually triggered integrity test so as to check the functional integrity of the renewed ultrafiltration membrane 103. Only when the test (for example, a pressure test such as described above) provides the result that the functional integrity of the ultrafiltration membrane 103 now is free from defects, the CPU 101 will switch on the system again, and the valves 106 through 108 as well as the pumps 109 and 110 are driven for producing filtered drinking water from supplied drinking water.

The system switch-off takes place such that even a shut down of the control device 101, e.g. by removing the electric power supply, does not lead to a deactivation of the water flow interruption.

In the following, a filtration unit 200 according to an exemplary embodiment of the invention will be described with reference to FIG. 2.

Figure 2:
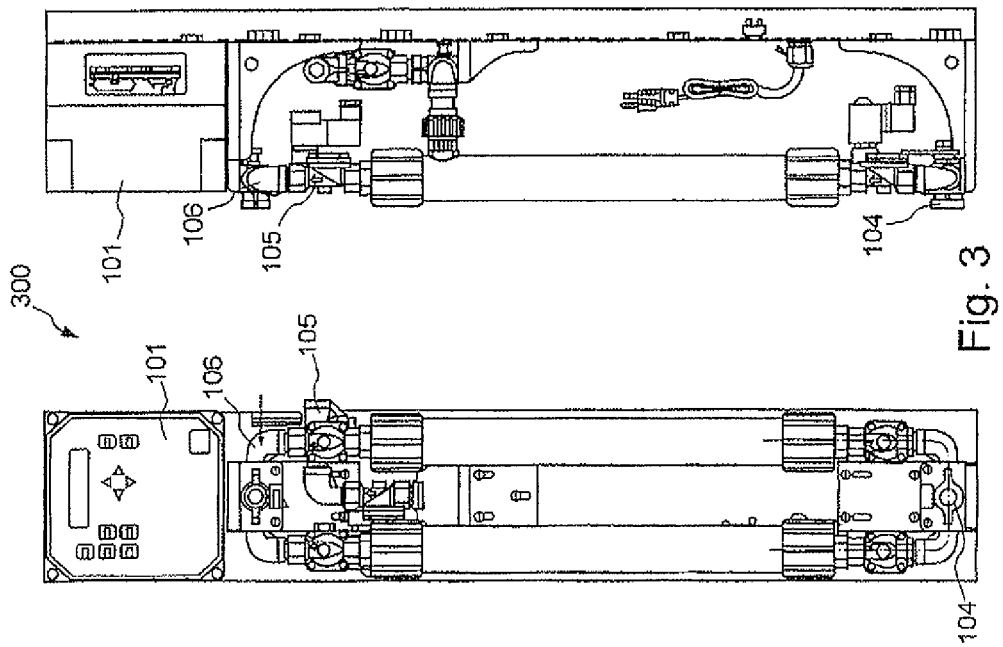
FIG. 2 shows two views of a filtration unit according to an exemplary embodiment of the invention.

FIG. 2 shows two different views of the filtration unit 200 constructed based on a Virex X-Spot filtration system of the company Seccua GmbH. The control device 101 of such a Virex X-Spot filtration unit 200 is adapted correspondingly in analogy to the functionality described with reference to FIG. 1.

In the following, an ultrafiltration unit 300 according to an exemplary embodiment of the invention will be described with reference to FIG. 3.

The ultrafiltration unit 300 is based on a Virex 120 filtration unit such as sold by the company Seccua GmbH. According to the invention, the control device 101 is adapted to this unit according to the invention.

Figure 3:
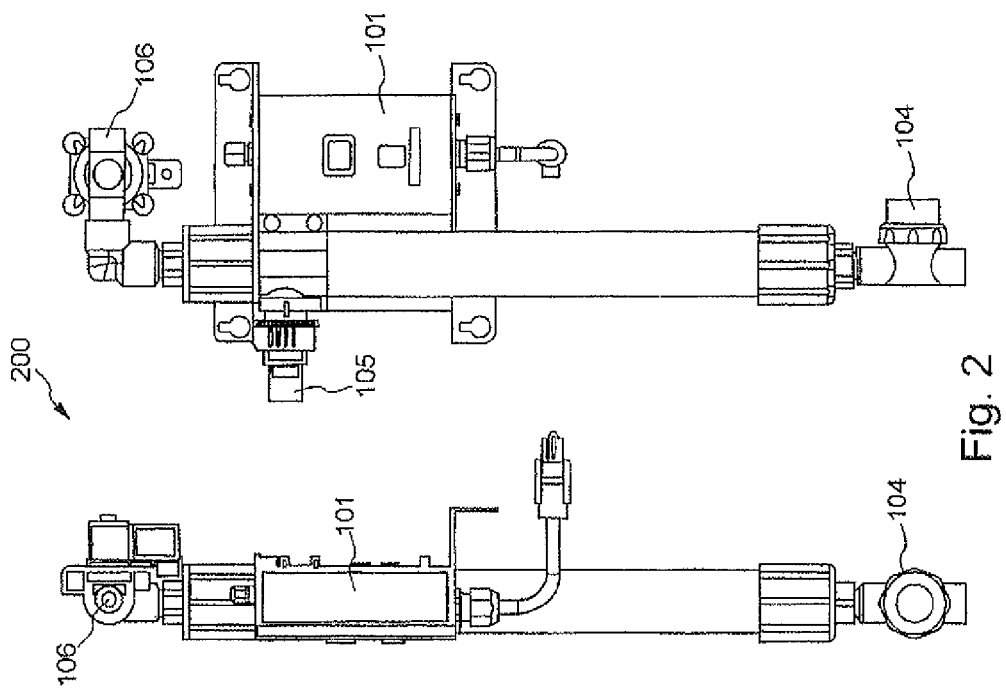
FIG. 3 shows two views of a filtration unit according to an exemplary embodiment of the invention.

In the embodiment as per FIG. 3, two parallel filter modules are provided including separate ultrafiltration membranes, whereas in the exemplary embodiment as per FIG. 2 only a single column is provided including such a membrane.

A particularity of this embodiment variant is that a backwashing process of one filter element may also take place using the filtered water of the other filter element. Also, more than 2 modules, e.g. 4 (2 modules backwash in each case 2 others) or 5 (3 modules backwash in each case 2 others), etc. may be operated in parallel.

In analogy to FIG. 1, where the water for backwashing is pressed through the membrane opposite to the filtration direction either by a pressure vessel or a pump, in this backwashing variant, the water for backwashing in each case is furnished alternately either by the first filter or the first set of filters or by the second filter or the second set of filters.

Exemplary embodiments of the invention may also implemented in a Virex 440 or Virex 900 or other newly to be developed units of any size of the Seccua GmbH.

In the following, a filtration system including a control device according to an exemplary embodiment of the invention will be described in detail with reference to FIG. 4 through FIG. 22.

Figures 4, 5:
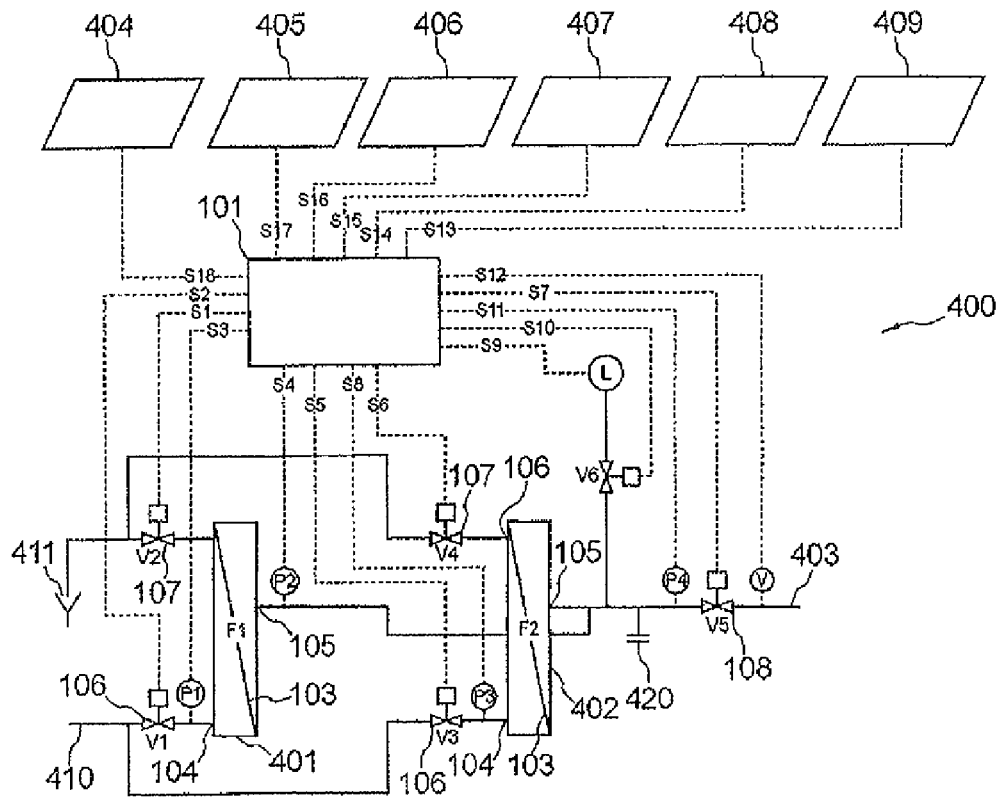
FIG. 4 is a schematic representation of a filtration unit for filtering water according to an exemplary embodiment of the invention.
FIG. 5 shows a table with valve positions according to a filtration mode.

In contrast to FIG. 1, two filtration membranes within corresponding modules 401, 402 are provided in the filtration arrangement 400 of FIG. 4.

A global inlet is designated with reference numeral 410, and a global rinsing water outlet is designated with reference numeral 411. The filtrate is supplied at a common filtrate connection 403.

The CPU 101 has a plurality of connected or connectable components, that is to say, a signal output Display 404, a signal input Keyboard 405, a signal output Dosing Pump Chemical Feed 406, a signal output Dosing Pump Chemical BW 407, a signal output Backwash Pump 408, and a signal output Feed Pump 409.

A plurality of valves and sensors are further provided, i.e. the valves V1 through V5, which may be solenoid valves or control valves, the closing time of the latter being adjustable at the valve or in the control device 101. V6 is a solenoid valve for controlling the compressed air or the compressed gas during the integrity test. F1 and F2 are ultrafiltration modules. L is an air compressor in a range of between 0 bar and 1 bar. P1 through P4 are pressure sensors in a measurement range of 0 bar to 10 bar. V is a volume flow rate meter measuring the amount of filtered water and continuously reporting this amount of filtered water to the control device 101.

In the following, the control signals will be described which can be generated by the CPU 101:
S1: drive of outlet valve V2
S2: drive of inlet valve V1

S3: analog input of inlet pressure sensor P1
S4: analog input of filtrate pressure sensor P2
S5: drive of inlet valve V3
S6: drive of outlet valve V4
S7: drive of filtrate valve V5
S8: analog input of inlet pressure sensor P2
S9: drive of air compressor L
S10: drive of compressed air valve V6
S11: analog input of filtrate pressure sensor P4
S12: filtrate volume flow rate meter
S13: output of feed pump
S14: output of backwash pump
S15: output of dosing pump
S16: output of dosing pump feed Further, a connection 420 is provided in FIG. 4 as a possible connection for a membrane container (backwashing).

In the following, the process 400 will be described that can be performed by means of the filtration unit.

The operation of the ultrafiltration unit 400 is subdivided into various operating states defined by the valve positions and the pump states. A defined sequence of various operating states is called a filtration cycle. After a defined number of filtration cycle passes, a chemically supported backwash may be carried out, if required. After this chemically supported backwash, the clean membrane may be tested with respect to its integrity ("integrity test").

In the operating state of filtration, the actual filtration takes place. Water from the inlet point (feed) is pressed through the membrane to the filtrate side (filtrate). Optionally, a chemical dosing pump may be activated during filtration by the signal S16, for example dosing a flocculant during the filtration process.

FIG. 5 shows a table 500 with the valve positions during the operating state of filtration.

The membrane is overflown during the forward flush mode, a water flow through the membrane does not take place.

Figure 6:
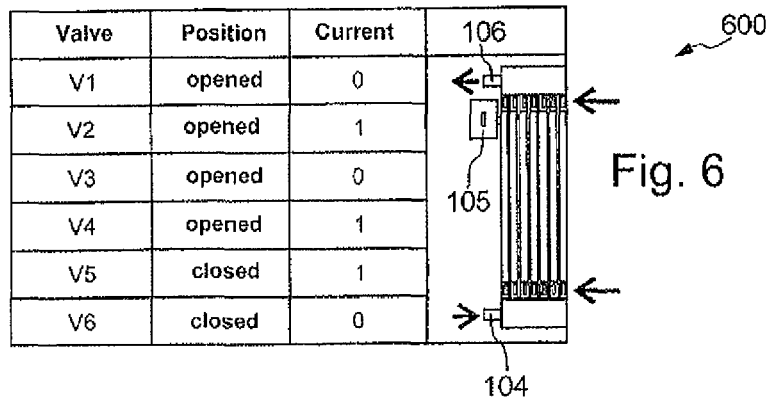
FIG. 6 shows a table with valve positions in a forward flush operating state.

FIG. 6 shows a table 600 defining the valve positions in a forward flush operating mode.

In the following, various possibilities for a backwash operating state will be described.

The back flushing of the membrane is called a backwash, i.e. that water is pressed through the membrane from the filtrate side to the inlet (feed) side and reaches the sewage (drain) from there. Optionally, a chemical dosing pump may be activated by the signal S15 (which can be operated, for example, in a "0"/"7" operation but also in dependence on the volume flow rate, controlled by the control device 101 in conjunction with the integrated volume flow rate meter), and adds cleaning chemicals into the filtered water used for flushing.

According to the invention, in particular the following two backwashing possibilities may be used:

The filtrate of one mode backwashes the other. This means that one module is in the filtration mode, the other is in the backwashing mode, and the filtrate valve V5 is closed at this time. After backwashing of the one module, the valve position will change and the second module will be backwashed.

Both modules are backwashed by a pump connected downstream of the unit, or by a membrane vessel connected downstream of the unit.

Figure 7:
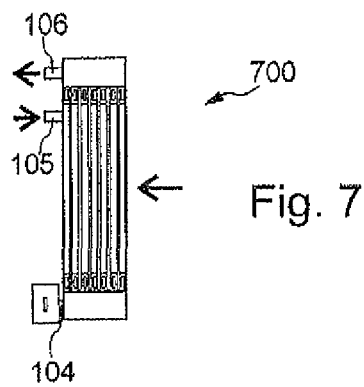
FIG. 7 illustrates a filtration unit in a backwash mode.

FIG. 7 shows a schematic drawing 700 illustrating the flow characteristics in a backwash mode.

A flushing out of the dirty water may take place through the connection 106 or the connection 104, or alternately.

Figure 8:
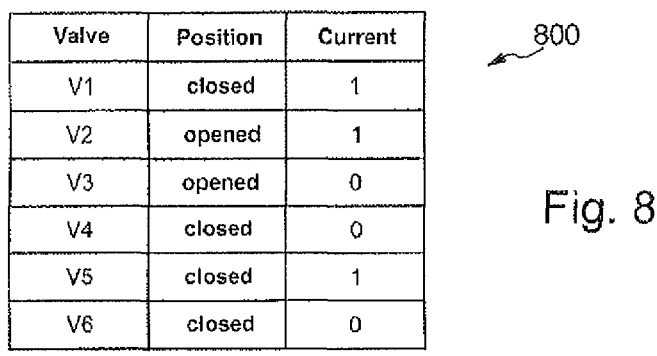
FIG. 8 illustrates valve positions in the backwash mode.

FIG. 8 shows a table 800 with valve positions in a backwash mode, in which the filter or the set of filters F1 is backwashed by the water filtered by the filter or the set of filters F2.

Figure 9:
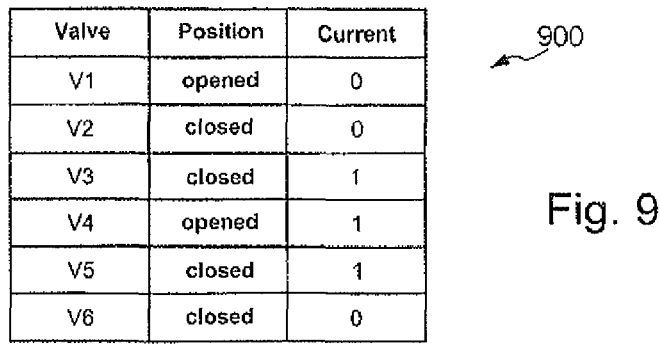
FIG. 9 shows a table with valve positions in a backwash mode.

FIG. 9 shows a table 900 with valve positions in a backwash mode, in which the filter or the set of filters F2 is backwashed by the water filtered by the filter or the set of filters F1.

Also, it is possible to perform the backwash of both filter units by pumps connected downstream or by a pressure vessel (e.g. a membrane container or merely a natural water column).

In this case, both modules are in the backwash mode. Additionally, the (if necessary, frequency-controlled) backwash pump is activated by the signal S14. The differential pressure between the filtrate and the inlet and outlet sides of the membrane, respectively, is limited to a maximum of 2.5 bar.

FIG. 10 shows a table 1000, in which the valve positions are shown in such a backwash operating mode.

FIG. 11A through FIG. 11E show an exemplary filtration cycle.

A filtration mode is shown in FIG. 11A. A forward flush operating mode is shown in FIG. 11B. An operating mode backwash F1 is shown in FIG. 11C. An operating mode backwash F2 is shown in FIG. 11D. A forward flush operating mode is shown in FIG. 11E.

In the following, a chemically supported backwash operating mode is described.

The dosing of cleaning chemicals during backwashing takes place optionally and is adjustable for each x-th cycle. Then the dosing pump for dosing cleaning chemicals is activated by the signal S15 (for example, by using a "0"/"1" operation, but there is also the possibility to control the amount of added cleaning chemicals in dependence on the backwash volume flow rate measured by the integrated volume flow rate meter of the unit).

FIG. 12 represents a schematic representation 1200 of such a chemically supported backwash operating mode. First, a cycle 1 1201 is run, then a cycle 2 1202, and finally a cycle X 1203. Thereafter, a chemical backwash 1204 takes place prior to a restart with cycle 1 1201. Each other combination of the methods is possible so as to enable an economically advantageous and optimized system performance. Basically, any combination may be chosen. A "chemical enhanced backwash" (CEB) even may be performed alone and without exposure time.

In the following, an integrity test will be described.

FIG. 13A through FIG. 13D show various processing steps during an integrity test carried out with compressed air or compressed gas (e.g. carbon dioxide).

As shown in FIG. 13A, first a dewatering process may take place on the permeate side with compressed air (for example, 1 bar). As shown in FIG. 13B, the pneumatic valve V6 subsequently will be closed as soon as the desired pressure (of e.g. 1 bar) is reached. As shown in FIG. 13C, a waiting period of 30 seconds, for example, is held. As shown in FIG. 13D, the pressure loss subsequently is measured over the time t, for example, for a duration of 2 minutes. If the pressure loss is less than 10 mbar per minute, then a perfect operation is assumed.

Following this, a filtration cycle may be started.

The operation of the control module 101 will be described in more detail below.

First, the programming process of such a control module 101 will be described.

At this time, cycles as shown in FIG. 11A through FIG. 11E are taken as a starting point. Each operating state is defined by the valve positions and the pump states. Each operating state requires input parameters.

In a filtration operating mode, the input parameters may be the duration of venting prior to the start of filtration, the duration of the filtration cycle (time, amount of filtrate, or both), the filtrate volume flow rate (if a feed pump is provided), a threshold value dp for triggering the backwash, and a dosing of chemicals in the inflow.

In a forward flush operating mode, the input parameters may be forward flush on/off or the duration of the forward flush.

In a backwash operating state, the input parameters may be backwash on/off, the backwash duration, backwash by an external pump or a membrane vessel or "one module the other", after how many backwash passes chemical substances are to be added, and the exposure time for chemicals (on/off, how long).

In an operating mode "forward flush after backwash", the input parameters may be forward flush on/off and the duration of the forward flush.

In an integrity test operating mode, the input parameters may be the interval between integrity tests, the dewatering duration, the pressure threshold value for switching off the compressor, the idle time duration after dewatering, the allowed pressure drop per minute, and the integrity test duration.

Various conditions are checked continuously during one operating state. If one condition is not satisfied, the program will change the process flow and will signal an alarm.

In an operating state of filtration, for example, a parameter to be monitored may be the differential pressure head between the inlet side and the filtrate side of the membrane filters (TMP), the TMP limit value and a volume flow. In an operating state of backwash, the parameters to be monitored may be the TMP head, the TMP limit value and the maximum volume flow or pressure at P2.

In an operating state of integrity test the parameter to be monitored may be the threshold value dp.

A chemically supported backwash may take place after a certain number of cycles (to be set in the menu) and upon exceeding the pressure limit value of filtration (TMP limit). The cycles each are counted starting from the last chemical cleaning.

In the following, various alarm groups will be represented that may be triggered upon detection of a malfunction.

First of all, an operating state of filtration will be described.

According to a code FI01, the condition may be checked whether P1-P2 is greater than an allowed maximum value dp or whether P3-P2 is greater than an allowed maximum value dp. In such a case, the message may be issued that the membrane is foul. A cleaning cycle may be initiated.

With a code FI02, the condition may be inquired immediately after the cleaning cycle whether P1-2 is greater than the allowed maximum value dp or whether P3-P2 is greater that the maximum value dp. In such a case, the message may be issued that the membrane is highly foul. A chemically supported backwash (if provided) may be initiated or a repeated cleaning cycle may be carried out.

With a code FI03, the condition is checked whether the volume flow rate is below the input threshold value and whether dp is less than this threshold value. The message may be issued that the crude water is not sufficient. Moreover, a message may be transmitted to a mobile telephone by an SMS.

With a code FI04, the condition may be checked whether the volume flow is below the input threshold value and whether dp is greater than the threshold value despite the cleaning. The message may be issued that the membrane has to be replaced. Such a corresponding message may be sent to a user's mobile phone by an SMS.

With a code FI05, the condition may be inquired whether P1 is less than or equal to P2 or an adjustable threshold value. This may trigger the message that a sufficient pressure is not available for the filtration. A corresponding message may be transmitted to the mobile phone by an SMS.

With a code FI06, the condition is checked whether P3 is less than or equal to P2 or an adjustable threshold value. In such a case, the message will be issued that a sufficient pressure is not available for the filtration. A corresponding message will be transmitted to the user's mobile phone by an SMS. In the following, alarm states will be described for the operating state of backwash.

With a code BW01, it is checked whether P2 is less than 1.5 bar. If this is the case, the message will be issued that a sufficient pressure for the backwash is not available. As a measure, BW will be executed further, and the user will be informed that the technical equipment for backwash (e.g. pump, membrane vessel or another pressure vessel, if provided) has to be inspected.

With a code BW02, the condition is checked whether the pump BW is available, and further whether P-P3 or P2-P1 is greater than 2.5 bar. Then the message "reduce pressure increase of pump BW" is issued. When the pump BW is frequency-controlled, then the pressure will be lowered, when the pump BW is not frequency-controlled, then the pump BW will be switched off, and the user will be informed that the backwash pump has to be inspected.

Various alarm states for the operating state of integrity test will be described in the following.

With a code IT01, the condition is checked whether P2 is less than 0.5 bar during dewatering. Then the message is issued that the compressor has to be inspected. This message is sent to the user's mobile phone by an SMS.

With a code IT02, the condition is checked whether the pressure drop during the actual integrity test (after dewatering and closing of the inlet and outlet valve(s) and the filtrate valve) is higher than a threshold value. If the pressure drops faster than an input threshold value, a corresponding message takes place by an SMS to the mobile phone or at the operating control that the membrane module is defective.

An integrity test to be performed will be described next in more detail.

The integrity test for the module is subdivided into five steps:

First, the valves V1, V3 are closed, and after that V5 is closed. Then, V2, V4 are opened, and after that V6 is opened, and a defined pressure of between 0.3 and 1 bar is applied to the permeate side (standard 0.5 bar).

After a predefined time, V6 is closed.

A defined break, for example, of 30 seconds is taken.

Over a determined period, for example, of about two minutes, the pressure drop is measured. If the measured value is above a definable threshold value (10 mbar/min.), an alarm message is output.

The filtration mode is initiated with a venting of the modules.

The input and output signals for the filtration unit 400 will be described next.

First, the control signals for the valves will be described, namely S1, S2, S5, S6, S7, S10.

These signals are used for driving the solenoid valves present on the unit. In addition, these signals also provide for the power supply of the valves, provided that valves are used with a DC voltage of 12 V at a power of 3.5 W. The drive takes place by an I/O signal, according to the normal position of the valves, these are either opened or closed upon application of a voltage. There is no feedback from the valves to be driven to the control device.

The signals S3, S4, S8, S11 are used as input signals for the pressure measurement. Over these signals, the forwarding of the pressure measurement at various points in the unit as measured by the pressure sensors P1 through P3 takes place to the control device. The pressure signal ranges in a width of 4 to 20 mA (0 to 10 volt) at a pressure measurement of 0 to 10 bar.

The signal S9 is for the power supply and drive of the air compressor.

The signal S9 provides the power supply for the air compressor, provided the air compressor may be supplied with 12 V. The power supply is applied for a maximum of 5 minutes during the process of the integrity test.

The signal S12 serves the purpose of an input signal for the volume flow rate meter. For being installed into the units, a volume flow rate meter may be provided feeding back, based on the principle of light barrier measurement, a binary square-wave signal to the control device which then has to be evaluated in the control device. A flow meter, for example, requires a voltage of 24 V.

A signal S13 controls the output of the feed pump. In some cases, a pressure increase pump is used for increasing the pressure of the filtration system. The signal S13 may be used in particular in two different ways:

For a filtrate volume flow-guided control of a speed-controlled feed pump (4 to 20 mA). In this case, a pump is controlled such that always a constant filtrate amount is produced (pressure increase upon fouling of the membrane). The desired filtrate amount may be set in the menu. A limit value for the pressure increase of the membrane is a maximum pressure difference between P1 and P2 or P3 and P2 of 2.5 bar.

For switching a relay for activating or deactivating a pump depending on the system status.

The signal S14 serves the purpose of driving the output of the backwash pump. In some cases, a backwash (backward flush) pump is used downstream of the unit for backwashing the system pressing water through the system in a direction opposite to the filtration direction. This pump, too, in particular may be driven in two ways:

For a volume flow-guided control of a speed controlled feed pump (4 to 20 mA). In this case, the pump is then controlled such that always a constant filter surface load takes place in the case of backwash. The desired surface load may be set in the menu. The limit value for the membrane pressure increase allows a desired pressure difference of 2.5 bar between P2 and P1 or P2 and P3.

For switching a relay for activating or deactivating a pump depending on the system status.

A signal S15 serves the purpose of controlling the output of the backwash dosing pump. Optionally, an addition of chemicals may take place during the backwash (for example, chlorine bleaching solution or hydrogen peroxide). For this purpose, a dosing pump is driven at a signal of 4 to 20 mA. For cost reasons, the drive is intended to be binary, the dosing volume flow rate control takes place at the dosing pump and remains constant.

A signal S16 serves the purpose of controlling the output of the feed dosing pump. Optionally, an addition of chemicals (for example, flocculant chemicals) into the inlet of the unit may take place during filtration. For this purpose, a dosing pump is driven at a signal of 4 to 20 mA. For cost reasons, the drive may be binary, the dosing volume flow rate control then takes place at the dosing pump and remains constant.

In FIG. 14, a table 1400 is shown describing the valve positions and the pump states.

In the brackets of FIG. 14, an operating state at power "on" is marked with (1), and at power "off" with (0), respectively, at a dynamic pump drive of optionally 4 to 20 mA.

Further, a menu having a control element and a display is provided in the filtration unit 400. The menu structure is described in FIG. 21 and FIG. 22.

Into this menu all necessary parameters for the operation of the unit are input. The complete programming may take place when a PC is connected to the control device through an USB interface provided on the unit. The menu surface may be set up in the form of a HTML page, and thus may be operated on the PC in a system-independent manner in any Web browser. The control element of the control device is to have a display on which the following tasks may be executed among others:

currently produced filtrate amount membrane integrity and alarm messages possibility of encoded alarm output (for example, four-digit).

In addition, the control element of the control device has keys enabling a configuration of the most important parameters at the device.

"arrow keys up/down" for guiding through the menu

"OK and Esc" for confirming or deleting an effected selection in the menu

"stop" stops filtration ("stop mode")

"start" starts filtration mode from the stop mode

Figure 15:
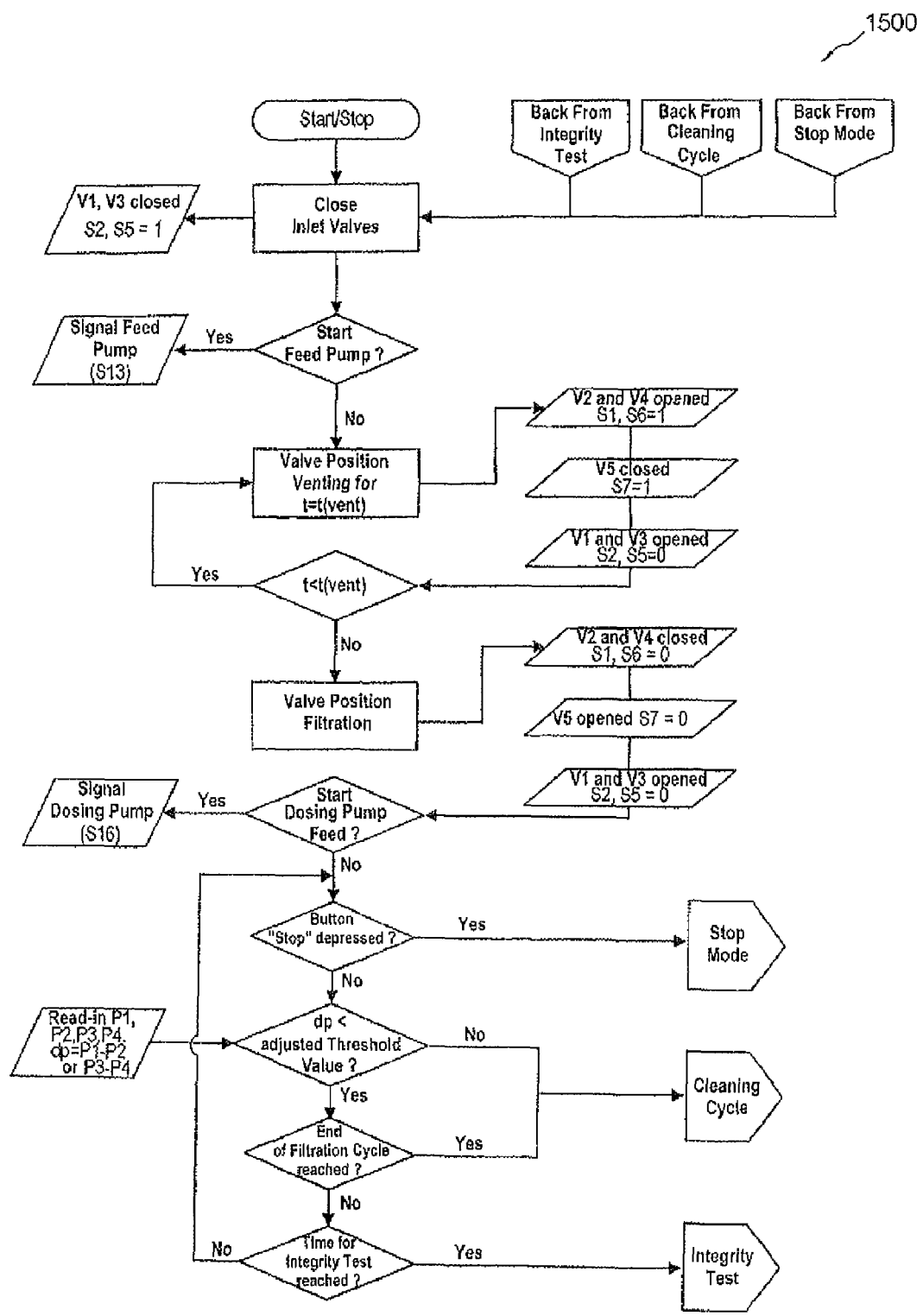
FIG. 15 shows a flowchart in a filtration mode.

FIG. 15 shows a flowchart 500 showing a flow diagram for the operating mode of filtration.

Figure 16:
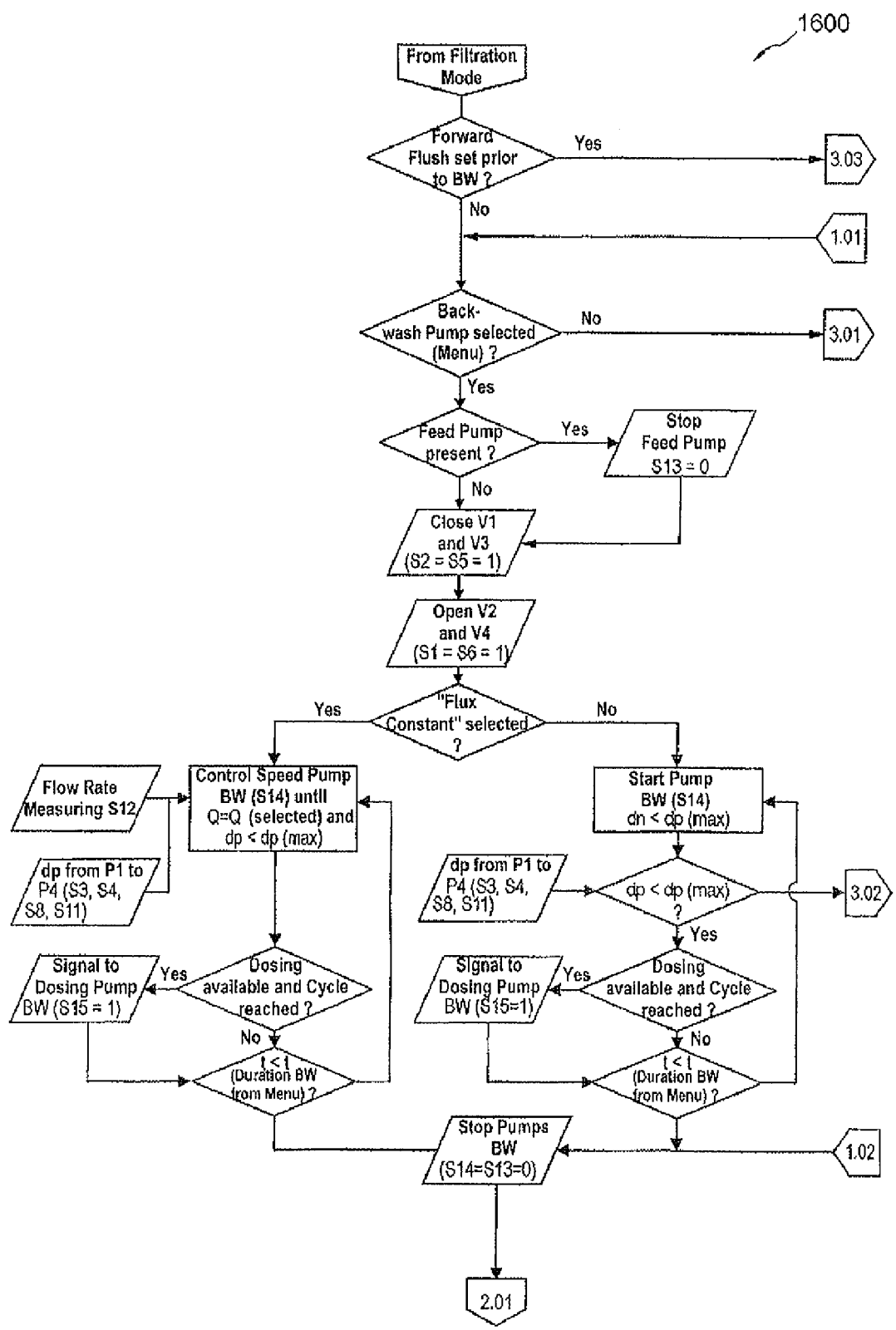
FIG. 16 through FIG. 18 show flow diagrams according to a cleaning cycle.
Figure 17:
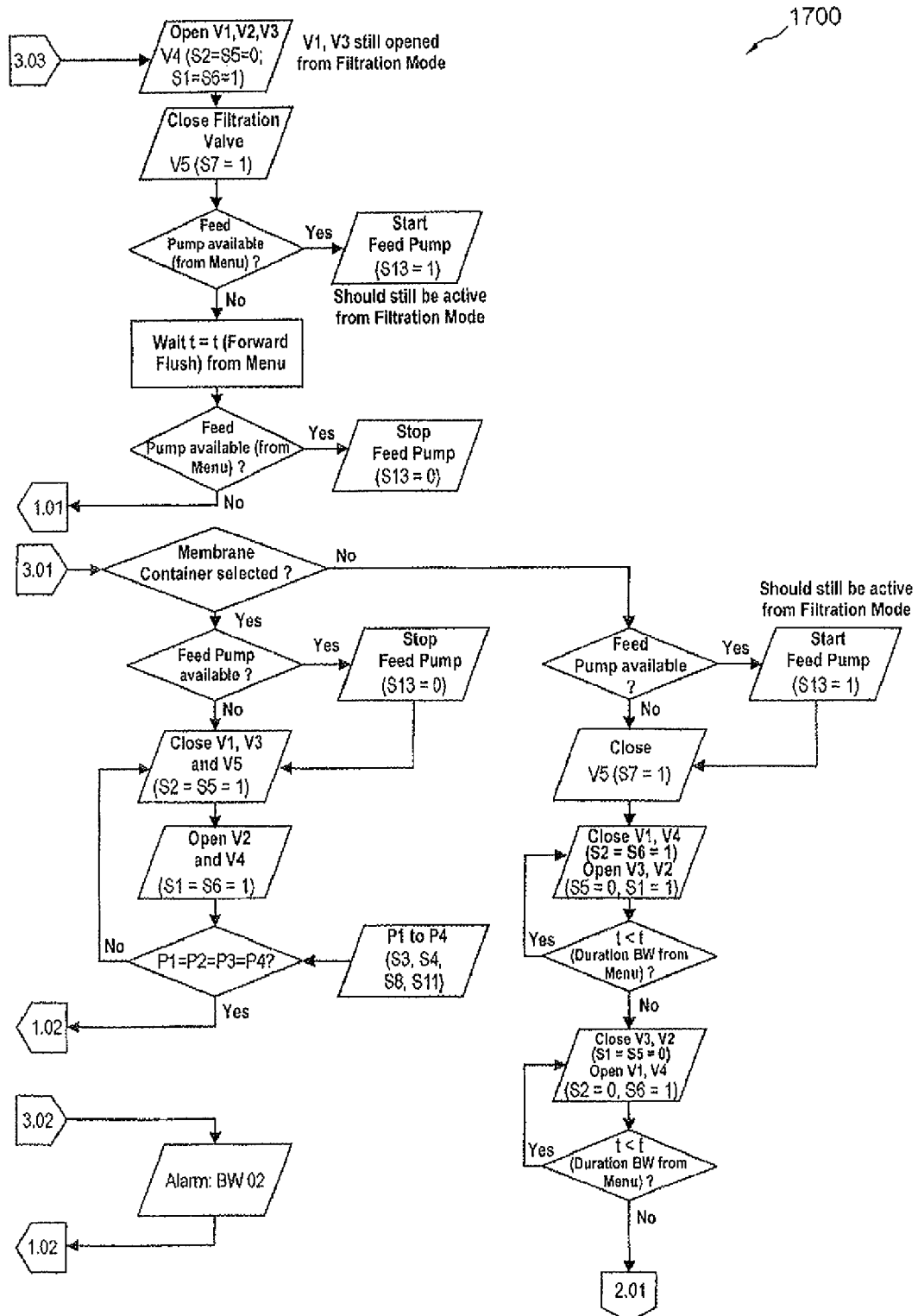
Figure 18:
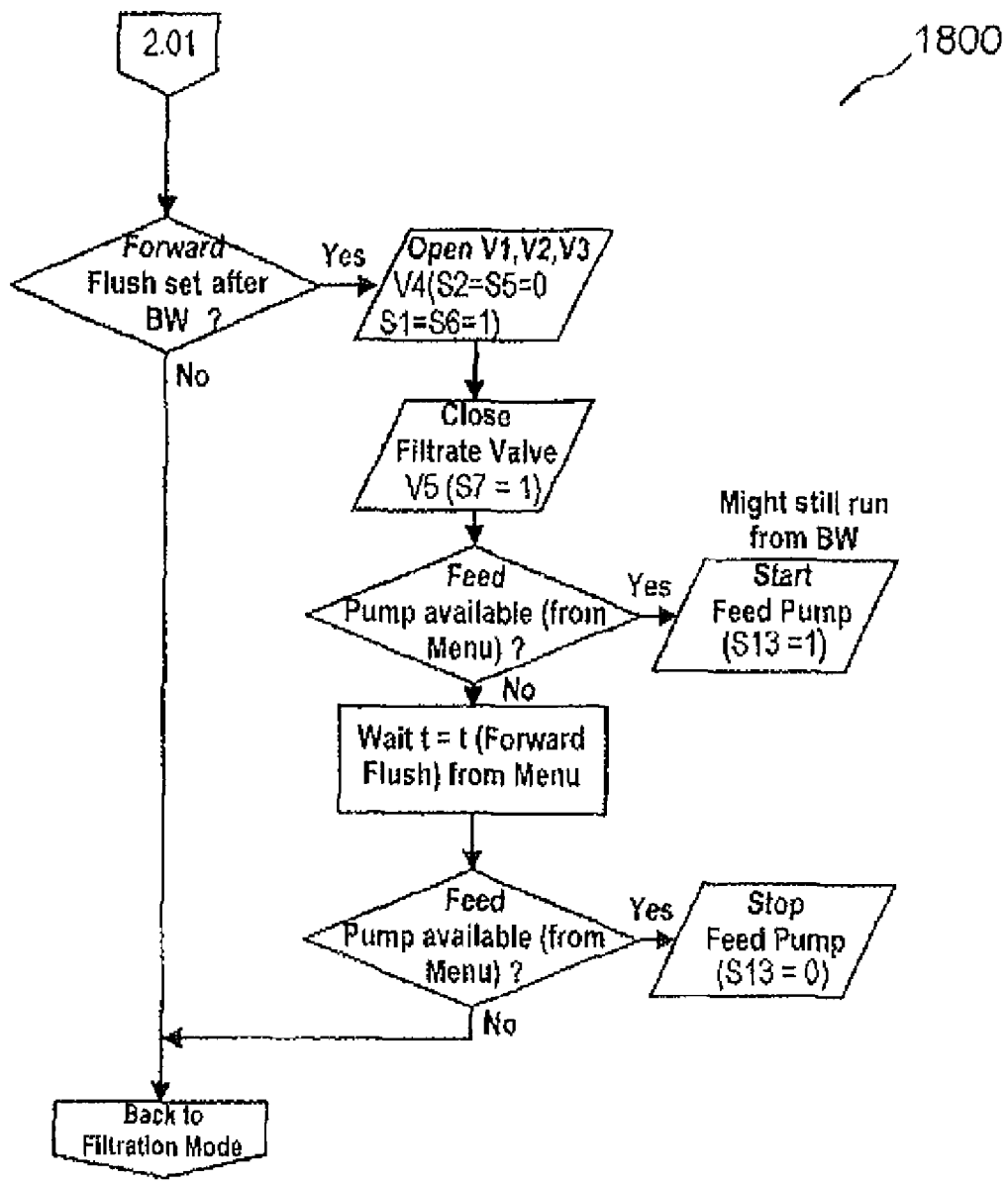

FIG. 16 through FIG. 18 show flowcharts 1600, 1700, 1800 describing in combination the operating state of cleaning cycle.

Figure 19:
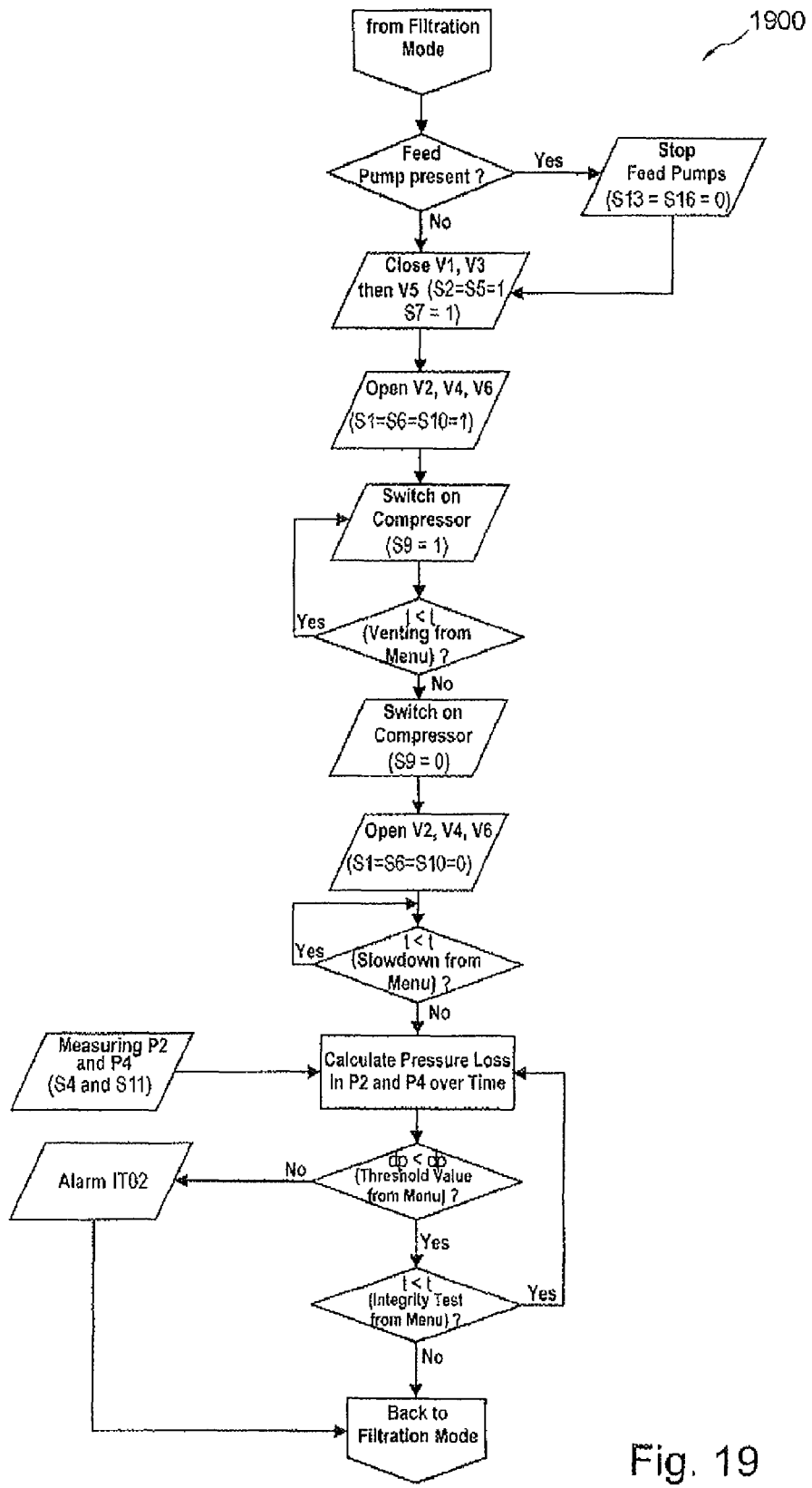
FIG. 19 shows a flowchart according to an integrity test.

FIG. 19 shows a flowchart 1900 representing the flow of the operating state of integrity test.

Figure 20:
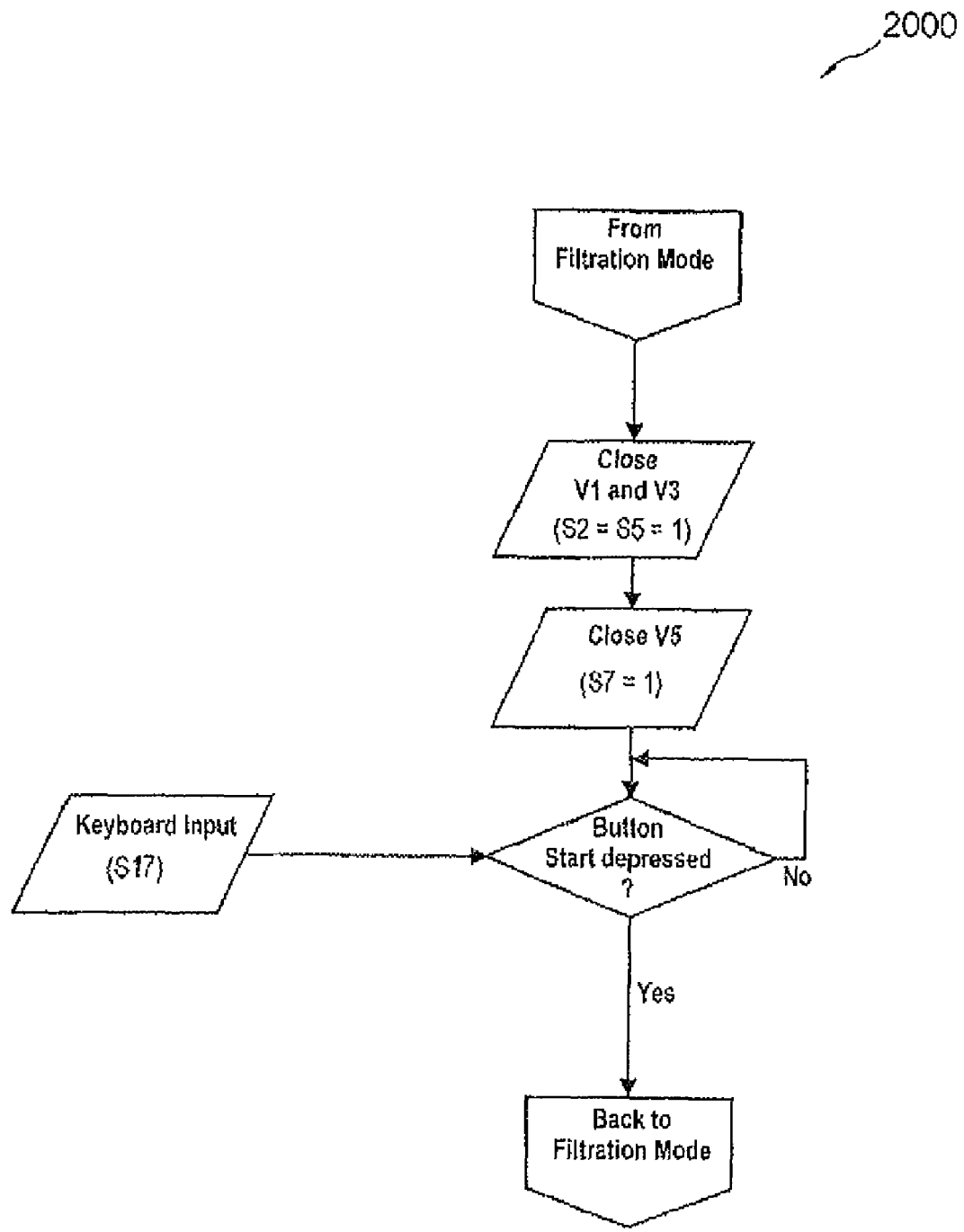
FIG. 20 shows a flow diagram according to a stop mode.

FIG. 20 shows a flowchart 200 showing the steps of a stop mode.

Figure 21:
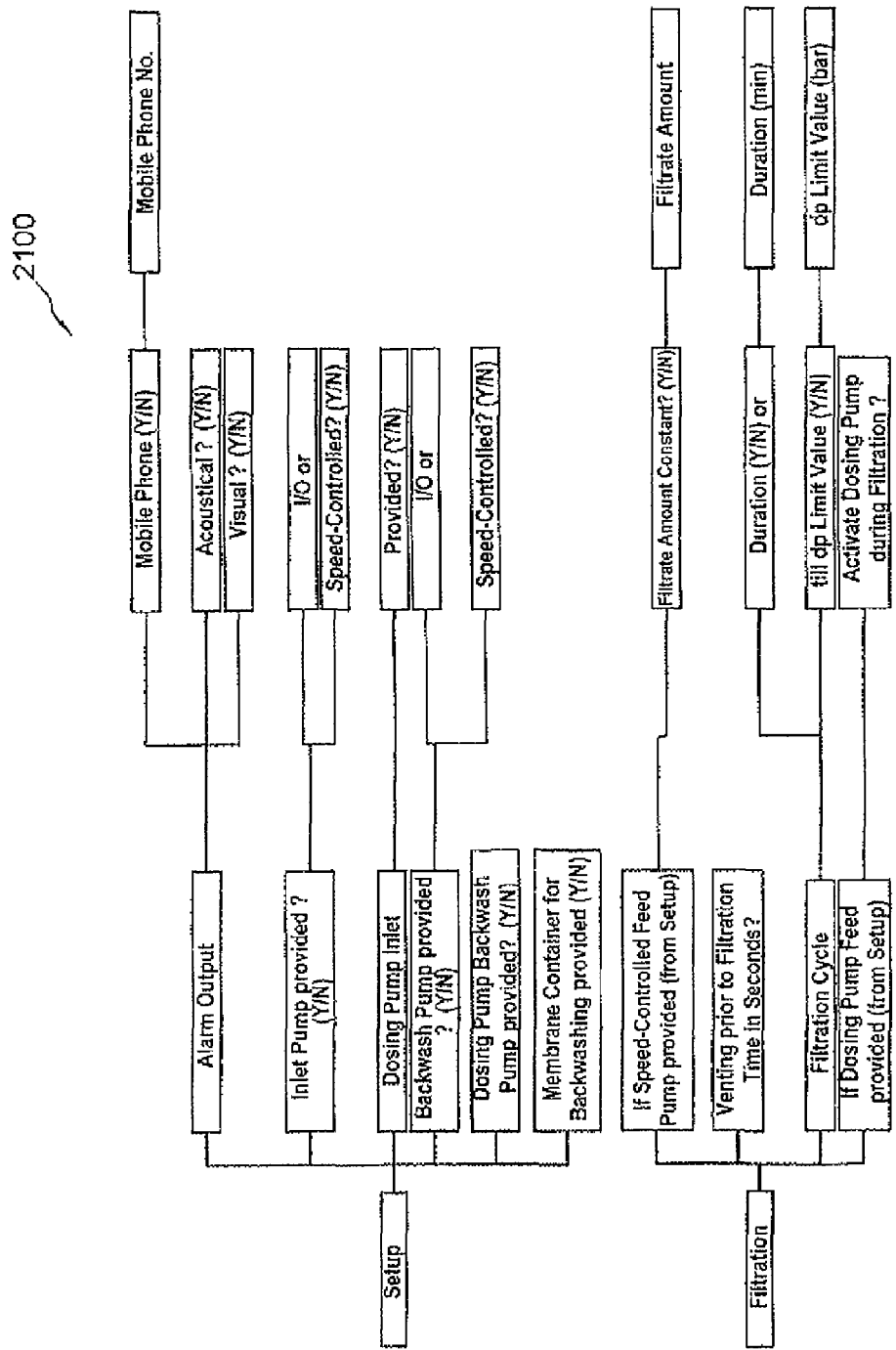
FIG. 21 and FIG. 22 illustrate the menu structure of a control device according to an exemplary embodiment of the invention.
Figure 22:
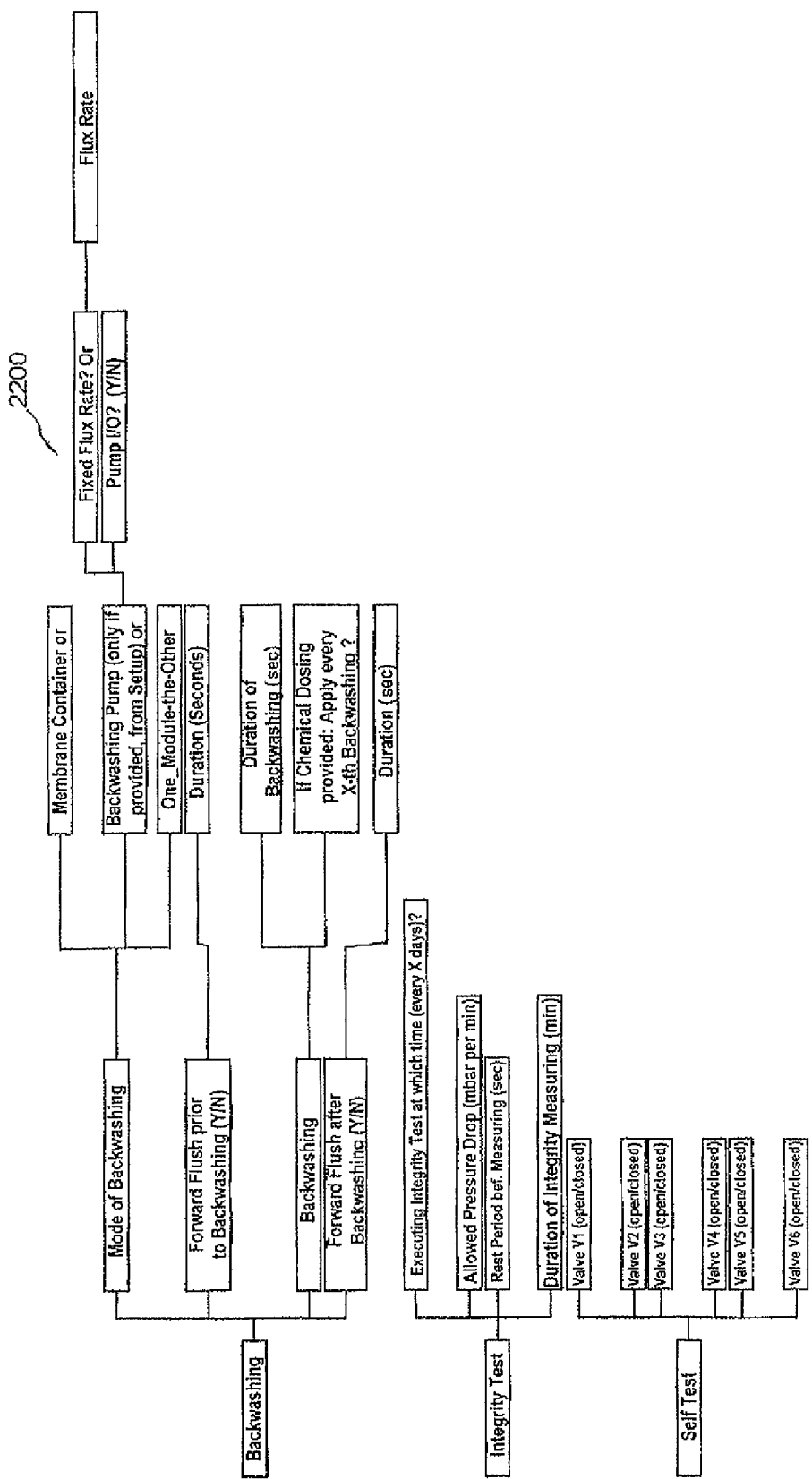

As already mentioned, FIG. 21 and FIG. 22 illustrate the menu mode in diagrams 2100 and 2200.

In summary, ultrafiltration systems are disclosed according to the invention allowing a filtration, in which a removal of viruses, bacteria, parasites is enabled by a pore size of less than 20 nm. Backwash is possible in all modules by means of a pump on the filtrate side. Moreover it is possible that one module washes the other in a special backwash mode.

The backwash of the modules may take place by means of water that can be pressed into the modules from a pressure container connected downstream or integrated on the filtrate side. A forward flush operating mode is provided. Further, an automatic integrity test is possible. The filtration process may be stopped in the case of a failed integrity test, in that case, the water output from the filtration is interrupted. Further, alarm messages may be issued by SMS or Bluetooth. The programming takes place via a USB interface, for example. Moreover, a control of a chemical addition during backwash is possible. A control of a chemical addition in the inlet is enabled. The feed pump may likewise be controlled. The backwash pump may be controlled. Furthermore, a measurement of the filtrate volume flow rate is possible. The measurement of differential pressures may take place via the filters. The rinsing cycles may be controlled according to the measured pressure losses. Moreover, the software of the control device may be adapted to an updated version ("upgrade" option) via an interface, and the language of displays, menus and user surfaces may be realized in various languages.

In completion, it should be noted that "comprising" does not exclude other elements or steps, and that "one" or "a" does not exclude a plurality. Moreover, it should be noted that features or steps described with reference to one of the above-mentioned exemplary embodiments also may be used in combination with other features or steps of other exemplary embodiments described above. Reference numerals in the claims are not intended to be taken as a restriction.

The invention claimed is:

1. A filtration system for filtering a fluid, wherein the filtration system comprises a filtration unit and a control device for the filtration unit, the control device arranged as an integrated circuit and comprising:
   an integrity test unit for performing an integrity test for checking the functional integrity of the filtration unit; and
   a reaction unit for determining a reaction based on a result of the integrity test;
   wherein the integrity test unit is configured to perform the integrity test in an automatic or user-defined manner;
   wherein the reaction unit generates an alarm message if the functional integrity of the filtration unit is compromised as identified by the integrity test unit, the alarm message comprising telenotification to a user performed by a mobile telephone network communication path;
   wherein the control device is arranged to be bidirectionally communicative with a remotely situated user, and to inform the user through a short messaging service ("SMS") or a multi-media messaging service ("MMS") that the filtration unit may be malfunctioning and such that the user may send defined commands to the control device via an SMS interface so as to initiate corrective measures.

2. The filtration system according to claim 1, wherein the integrity test unit is arranged for checking the functional integrity of a filter membrane by conveying and detecting a test substance essentially impermeable to the filter membrane in the functional state of the filter membrane.

3. The filtration system according to claim 1, wherein the reaction unit switches off at least a part of the filtration unit if the functional integrity of the filtration unit is compromised as identified by the integrity test unit.

4. The filtration system according to claim 1, further comprising a restart unit arranged for identifying a restored functional integrity of the filtration unit after a malfunction and for restarting the filtration unit.

5. The filtration system according to claim 1, wherein said control device is arranged as a monolithic integrated circuit.

6. The filtration system according to claim 1, wherein said control device is configured as a retrofit kit for installation into an existing filtration unit.

7. The filtration system according to any one of claim 1, 2, 3, 4, 5, or 6, comprising at least one filter membrane for filtering the fluid.

8. The filtration system according to claim 7, wherein the at least one filter membrane is selected from the group consisting of a fine filter membrane, a microfilter membrane, an ultrafilter membrane, and a nanofilter membrane.

9. The filtration system according to claim 7, further comprising an inlet connection for feeding the fluid to be filtered to the filter membrane.

10. The filtration system according to claim 7, further comprising a filter fluid connection for discharging the fluid filtered by the filter membrane.

11. The filtration system according to claim 7, further comprising an outlet connection for discharging fluid that has not flown through the filter membrane.

12. The filtration system according to claim 7, further comprising one or more of an inlet connection, fluid filter connection or outlet connection and at least one valve capable of adjusting the inlet connection, the fluid filter connection, or the outlet connection.

13. The filtration system according to claim 12, wherein the control device is arranged for controlling the at least one valve.

14. The filtration system according to claim 13, wherein the control device for controlling the at least one valve is arranged for adjusting an operating mode selected from the group consisting of a filtration mode for conveying the fluid from the inlet connection through the at least one filter membrane to the filter fluid connection, a membrane rinsing mode for conveying the fluid from the inlet connection along the at least one filter membrane to the outlet connection, and a reflux mode for conveying the fluid from the filter fluid connection through the at least one filter membrane to the outlet connection.

15. The filtration system according to claim 1, further comprising at least one pump for conveying the fluid through the filtration unit.

16. The filtration system according to claim 1, wherein said filtration unit is capable of disinfecting drinking water and/or service water, removing Legionellae from sanitary facilities in hospitals, schools and/or swimming pools, or for disinfecting water in swimming pools.

17. The filtration system according to claim 1, wherein the integrity test unit performs the integrity test for checking the functional integrity of a filter membrane for filtering the fluid; and for checking the functional integrity of the filter membrane by applying a test pressure to the filter membrane and measuring time response of the test pressure at the filter membrane as indicated by a change in the test pressure over time.

18. The filtration system of claim 1, wherein the filtration unit is integrated into a home water system.

19. A method of controlling a filtration unit for filtering a fluid, the method comprising:
   providing a filtration system comprising a filtration unit and providing a control device arranged as an integrated circuit installed into the filtration system;
   the control device performing an integrity test with an integrity test unit in an automatic or user-defined manner;
   the control device generating an alarm message comprising telenotification to a user performed by a mobile telephone network communication path, if the functional integrity of the filtration unit is compromised as identified by the integrity test unit;
   the control device informing the user through a short messaging service ("SMS") or a multi-media messaging service ("MMS") that the filtration unit may be malfunctioning via a control device, wherein the control device is arranged to be bidirectionally communicative with a remotely situated user; and
   sending defined commands via SMS by a user to an interface coupled to or part of the control device so as to initiate corrective measures.

20. A computer-readable data carrier, on which a program for controlling a filtration unit for filtering a fluid is stored, wherein said program, when executed by a processor, controls or performs the method according to claim 19.

21. A program element for controlling a filtration unit for filtering a fluid, wherein said program element, when executed by a processor, controls or performs the method according to claim 19.

22. The method of claim 19, wherein the filtration unit is integrated into a home water system.

* * * * *